US012073619B1

(12) United States Patent
Cheruku et al.

(10) Patent No.: US 12,073,619 B1
(45) Date of Patent: Aug. 27, 2024

(54) LABEL RECOGNITION AND NOTIFICATION FOR STREAMING VIDEO FROM NON-OVERLAPPING CAMERAS

(71) Applicant: Amazon Technologies, Inc., Seattle, WA (US)

(72) Inventors: Prathyusha Reddy Cheruku, Seattle, WA (US); Joseph P Tighe, Seattle, WA (US); Alessandro Bergamo, Seattle, WA (US); Vivek Bhadauria, Redmond, WA (US); Shubham Chandra Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 250 days.

(21) Appl. No.: 17/547,977

(22) Filed: Dec. 10, 2021

(51) Int. Cl.
    *G06V 20/40*     (2022.01)
    *G06V 20/20*     (2022.01)
    *H04N 23/661*     (2023.01)

(52) U.S. Cl.
    CPC ............. *G06V 20/40* (2022.01); *G06V 20/20* (2022.01); *H04N 23/661* (2023.01)

(58) Field of Classification Search
    CPC ....... G06V 20/40; G06V 20/20; H04N 23/661
    USPC ......................................................... 382/101
    See application file for complete search history.

(56) References Cited

U.S. PATENT DOCUMENTS

| | | | |
|---|---|---|---|
| 2012/0263154 A1* | 10/2012 | Blanchflower ......... | G06T 11/60 455/414.1 |
| 2020/0005079 A1* | 1/2020 | Bapat ............... | G08B 13/19645 |
| 2020/0226416 A1 | 7/2020 | Bapat et al. | |

OTHER PUBLICATIONS

Non-Final Office Action, U.S. Appl. No. 17/548,026, May 10, 2023, 14 pages.
Chen et al., "Integrating Social Grouping for Multitarget Tracking Across Cameras in a CRF Model", IEEE Transactions on Circuits and Systems for Video Technology, vol. 27, No. 11, Nov. 2017, pp. 2382-2394.
Cheng et al., "Matching of Objects Moving Across Disjoint Cameras," IEEE International Conference on Image Processing, Oct. 2006, 5 pages.

(Continued)

*Primary Examiner* — Stephen P Coleman
(74) *Attorney, Agent, or Firm* — NICHOLSON DE VOS WEBSTER & ELLIOTT LLP

(57) ABSTRACT

Techniques for label recognition and notification for streaming video from non-overlapping cameras. A stream processing service of a provider network receives a first video stream from a first camera-equipped electronic device via an API endpoint of the stream processing service. The stream processing service also receives a second video stream from a second camera-equipped electronic device an API endpoint of the stream processing service. Meanwhile, a request for label recognition and notification is received at a computer vision service of the provider network via an API endpoint of the computer vision service. In response, the computer vision service recognizes a label in a video fragment of the first camera video stream and recognizes a label in a video fragment of the second camera video stream, and then identifies whether the two labels are the same label. If so, a notification service of the provider network sends a notification indicating that the label was recognized across non-overlapping cameras.

18 Claims, 9 Drawing Sheets

(56) References Cited

OTHER PUBLICATIONS

Cong et al., "Robust Visual Tracking via MCMC-Based Particle Filtering", IEEE International Conference on Acoustics, Speech and Signal Processing, Mar. 2012, 4 pages.
He et al., "Deep Residual Learning for Image Recognition", IEEE Conference on Computer Vision and Pattern Recognition, 2016, pp. 770-778.
He et al., "Identity Mappings in Deep Residual Networks," European Conference on Computer Vision, Part IV, LNCS 9908, 2016, pp. 630-645.
Hou et al., "Human Tracking over Camera Networks: A Review", EURASIP Journal on Advances in Signal Processing, Article No. 43, 2017, pp. 1-20.
Howard et al., "Mobilenets: Efficient Convolutional Neural Networks for Mobile Vision Applications", Computer Vision and Pattern Recognition, 2017, 9 pages.
Howard et al., "Searching for MobileNetV3", Proceedings of the IEEE/CVF International Conference on Computer Vision, 2019, 11 pages.
Hu et al., "Squeeze-and-Excitation Networks," Proceedings of the IEEE Conference on Computer Vision and Pattern Recognition, 2017, 13 pages.
Huang et al., "Densely Connected Convolutional Networks," Proceedings of the IEEE Conference on Computer Vision and Pattern Recognition, vol. 1, No. 2, Aug. 2016, 9 pages.
Iandola et al., "SqueezeNet: AlexNet-Level Accuracy with 50x Fewer Parameters and <0.5mb Model Size", Conference on Computer Vision and Pattern Recognition, 2016, 13 pages.
Jang et al., "Active Models for Tracking Moving Objects," Pattern Recognition, vol. 33, No. 7, 2000, pp. 1135-1146.
Liao et al., "Person Re-Identification by Local Maximal Occurrence Representation and Metric Learning", IEEE International Conference on Computer Vision and Pattern Recognition (CVPR 2015), Jun. 2015, 10 pages.
Lin et al., "Microsoft COCO: Common Objects in Context", European Conference on Computer Vision, Part V, LNCS 8693, 2014, pp. 740-755.
Liu et al., "Eigenshape Kernel Based Mean Shift for Human Tracking", IEEE International Conference on Computer Vision Workshops, Nov. 2011, pp. 1809-1816.
Liu et al., "SSD: Single Shot MultiBox Detector", European Conference on Computer Vision, Part I, LNCS 9905, 2016, pp. 21-37.
Rasmussen et al., "Probabilistic Data Association Methods for Tracking Complex Visual Objects", IEEE Transactions on Pattern Analysis and Machine Intelligence, vol. 23, No. 6, Jun. 2001, pp. 560-576.
Redmon et al., "YOLOv3: An Incremental Improvement," Computer Vision and Pattern Recognition, 2018, 6 pages.
Ren et al., "Faster R-CNN: Towards Real-Time object Detection with Region Proposal Networks," Advances in Neural Information Processing Systems, vol. 28, 2015, pp. 91-99.
Ristani et al., "Performance Measures and a Data Set for Multi-Target, Multi-Camera Tracking", European Conference on Computer Vision, Part II, LNCS 9914, 2016, pp. 17-35.
Sandler et al., "Inverted Residuals and Linear Bottlenecks: Mobile Networks for Classification, Detection and Segmentation", IEEE Conference on Computer Vision and Pattern Recognition (CVPR), 2018, 14 pages.
Simonyan et al., "Very Deep Convolutional Networks for Large-Scale Image Recognition", The 3rd International Conference on Learning Representations (ICLR 2015), 2015, 14 pages.
Wang et al., "Temporal Segment Networks: Towards Good Practices for Deep Action Recognition," European Conference on Computer Vision, Part VIII, LNCS 9912, 2016, pp. 20-36.
Xie et al., "Aggregated Residual Transformations for Deep Neural Networks", 2017 IEEE Conference on Computer Vision and Pattern Recognition (CVPR), 2017, pp. 5987-5995.
Zhang et al., "Global Data Association for Multi-Object Tracking using Network Flows", IEEE Conference on Computer Vision and Pattern Recognition, Jun. 2008, 8 pages.
Zhang et al., "ResNeSt: Split-Attention Network", Computer Vision and Pattern Recognition, 2020, 12 pages.
Zúñiga et al., "Real-Time Reliability Measure-Driven Multi-Hypothesis Tracking using 2D and 3D Features", EURASIP Journal on Advances in Signal Processing, No. 1, 2011, pp. 1-21.
Non-Final Office Action, U.S. Appl. No. 17/548,125, Feb. 15, 2024, 14 pages.
Requirement for Restriction/Election, U.S. Appl. No. 17/548,125, Nov. 9, 2023, 5 pages.
Talloen, Jules, "ML6 Internship: Pedestrian Tracking over Multiple Non-Overlapping Camera Viewpoints", Available Online at <https://blog.ml6.eu/ml6-internship-pedestrian-tracking-over-multiple-non-overlapping-camera-viewpoints-5b405c6df7e0>, Feb. 14, 2020, 20 pages.
Zheng, et al., "Person Re-identification: Past, Present and Future", Journal of Latex Class Files, vol. 14, No. 8, Available Online at <arxiv.org/pdf/1610.02984.pdf>, Aug. 2015, pp. 1-20.

* cited by examiner

US 12,073,619 B1

LABEL RECOGNITION AND NOTIFICATION FOR STREAMING VIDEO FROM NON-OVERLAPPING CAMERAS

BACKGROUND

Camera-equipped electronic devices with the capability to stream captured video over data communications networks are becoming ubiquitous. Numerous electronic device companies and Software-as-a-Service (SaaS) providers are working to automate recognition of objects that appear in digital video streams captured by such devices. This technology is sometimes called "object recognition." Generally, the technology involves recognizing instances of semantic objects of certain classes such as humans, buildings, or cars in video. An issue with this technology is, however, a real-time recognition and notification of objects in streaming video. Further, addressing this issue while keeping device cost, service cost, and operational complexity relatively low can be a significant challenge to electronic device companies and SaaS providers.

Relatedly, camera-equipped electronic devices can operate in varied real-world conditions. For example, cameras may operate in different lighting conditions such as bright indoors, outdoors at different times of the day, dimly lit parking lots, etc., and at different camera angels such as overhead and at face height. Without accounting for these situations related to particular conditions and configurations, an object recognition system may not be very accurate in a given environment.

The techniques disclosed herein address these and other issues.

BRIEF DESCRIPTION OF THE DRAWINGS

Various embodiments in accordance with the present disclosure will be described with reference to the drawings, in which.

DETAILED DESCRIPTION

Figure 1:
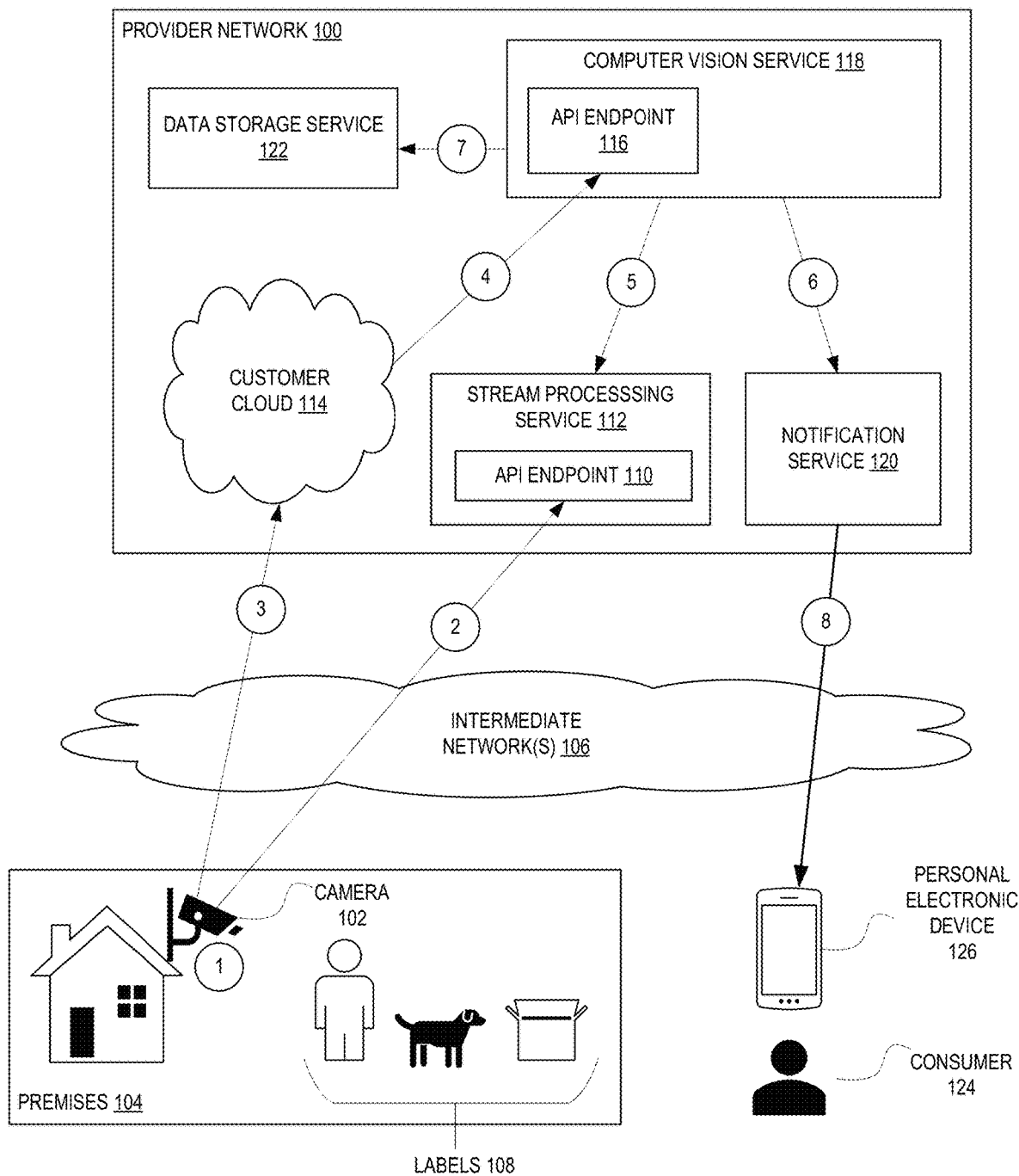
FIG. 1 is a diagram illustrating an environment for label recognition and notification for streaming video according to some embodiments.

There is a need for a streaming video label recognition and notification solution that is scalable, cost-effective, and accurate. Techniques herein provide a machine learning-based label recognition and notification system for streaming video such as, for example, video streamed from a camera-equipped electronic device such as, for example, a home security camera. In addition to the home security context, the techniques may be employed in other contexts. For example, the techniques may be employed in the business or enterprise security context, in the educational context, in the content moderation context, and in the celebrity and public figure context. Examples use cases of using the techniques in these contexts are provided throughout the following description.

As used herein, a "label" may refer to any of the following that may appear in a video frame of streaming video: an object (e.g., a person, a pet, a package, etc.), an event (e.g., a wedding, a graduation, a birthday party, etc.), a concept (e.g., a landscape, an evening, a sunset, nature, etc.), or an activity (e.g., existing a vehicle, opening a door, riding a bike).

In some embodiments, a camera-equipped electronic device is configured to send a video stream to an application programming interface (API) endpoint of a stream processing service in a provider network. The stream processing service is configured to provide a selected fragment of the received video stream to a computer vision service in the provider network. The selected fragment may have a relatively short duration (e.g., ten seconds) and correspond to when an activity is detected by the camera-equipped device. The activity detected may be motion in front of the camera, sound such as from a child crying, or smoke from a fire, as just some examples. The computer vision service is configured to recognize a label of interest in the provided fragment. For example, the computer vision service may be configured to recognize a person, a pet, a package, or other type of label in the fragment. If a relevant label is recognized in the fragment, a notification service in the provider network sends a notification of the recognized label to a user or to another system. The notification may include or refer to the video fragment in which the relevant label was recognized, a class of the recognized label (e.g., person, pet, or package), a time stamp, a bounding box, among other notification attributes.

Recognizing a label in video captured by a camera-equipped electronic device might commence by someone (e.g., Alicia as the consumer and end-user of the camera-equipped electronic device) indicating that they would like to be notified (e.g., by a text message or via an application on their mobile computing device) whenever a package or an unfamiliar person is recognized in video captured the device. This might be useful, for example, if the camera-equipped electronic device is a smart doorbell that captures video of the area in front of the front door to Alicia's home. According to techniques herein, the smart doorbell can be configured to stream video to the stream processing service in the provider network whenever the smart doorbell detects motion in front of the camera. At the same time, the smart doorbell can trigger a computer vision service of the provider network to analyze the video streamed from the smart doorbell for packages or unfamiliar persons. The computer vision service in the provider network analyzes the streamed video. If a package or an unfamiliar person is recognized, then a notification may be provided to Alicia's mobile computing device or to another system. The notification may include or refer to a still image from the analyzed video with a bounding box around a package or an unfamiliar person recognized in the fragment.

In some embodiments, techniques provide unique label recognition and notification for streaming video. A video stream from a camera-equipped electronic device is received at the API endpoint of the stream processing service. A request for unique label recognition and notification is received at the API endpoint of the computer vision service. The computer vision service analyzes a video fragment of the video stream. If a unique label is recognized in the video fragment, then the notification service sends a notification that the unique label was recognized in video captured by the camera-equipped electronic device.

Further, some embodiments of the techniques provide familiar and unfamiliar label recognition and notification for streaming video. The stream processing service receives a video stream from a camera-equipped electronic device (e.g., Alicia's doorbell camera) at an API endpoint of the stream processing service. A request for familiar and unfamiliar label recognition and notification is received at an API endpoint of the computer vision service. If the computer vision service recognizes a familiar label or an unfamiliar label (e.g., a known person or an unknown person) in a video fragment of the video stream, then the notification service sends a notification that the familiar or unfamiliar label was recognized in video captured by the camera-equipped electronic device.

In some embodiments, the techniques provide label recognition and notification for streaming video from non-overlapping cameras. For example, Alicia might have two home security cameras with non-overlapping fields of view around their home, one capturing video of the front yard and the other capturing video of the back yard. The stream processing service may receive a first video stream from the front yard camera at the API endpoint of the stream processing service. The stream processing service may also receive a second video stream from the back yard camera at the API endpoint. Meanwhile, a request for label recognition and notification may be received at the computer vision service. In response, the computer vision service may recognize a label in a video fragment of the front yard camera video stream and recognize a label in a video fragment of the back yard camera video stream and then identify whether the two labels are the same label. If so, the notification service may send a notification indicating that the label was recognized across non-overlapping cameras.

Techniques herein improve the technical field of applied computer vision. For one, the APIs of the API endpoints provided by the stream processing service and the computer vision service allow camera-equipped electronic devices and their manufacturers to integrate with and leverage sophisticated and complex machine learning (ML) models and stream processing infrastructure for performing various label recognition tasks on streaming video without having to build those models and infrastructure from scratch and without duplicating the same effort of others. Relatedly, with the techniques herein, camera-equipped electronic device manufactures can offer video streaming analysis functionality to their customers without needing expensive hardware, recorders, or video management systems. Further, the APIs and API endpoints of the stream processing service and the computer vision service allow for separation of concerns. Camera-equipped electronic device manufacturers can focus on developing and providing low-cost, relatively simple, and reliable devices while provider networks can focus on developing machine learning models for computer vision tasks that can scale to many users and provide a high degree of accuracy.

FIG. 1 illustrates a process and an environment for label recognition and notification for streaming video. The process is depicted by Operations 1 through 8 as shown within circles in FIG. 1. In summary, the process proceeds in the environment at Operation 1 by camera-equipped electronic device 102 (or just "camera 102") at premises 104 detecting a video-analysis triggering event (or just "trigger event") such as, for example, motion in front of camera device 102. At Operation 2, camera 102 streams camera-captured video over intermediate network(s) 106 to API endpoint 110 of stream processing service 112 (or just "stream processor 112") in provider network 100. Depending on what caused the trigger event, the captured video frames may contain images of one or more labels 108 of interest such as, for example, a person, a pet, or a package. At Operation 3, camera device 102 sends a notification of the trigger event over intermediate network(s) 108 to customer cloud 114 in provider network 100. At Operation 4, customer cloud 114 sends a request to API endpoint 116 of computer vision service 118 in provider network 100. The request is to analyze the video captured by camera device 102 for label recognition and notification. For example, the request may be to analyze the video for package labels. At Operation 5, computer vision service 118 obtains the video stream from stream processing service 112 and applies a computer vision technique to the video. If a label of interest is recognized in the streamed video, then, at Operation 6, computer vision service 118 publishes a notification of this to notification service 120. At Operation 7, computer vision service 118 writes the results of the analysis of the video to data storage service 122. At Operation 8, consumer 124 receives a notification at their personal electronic device 126 that a label of interest (e.g., a package) was detected in video captured by camera 102.

While in some variations such as depicted in FIG. 1 on notification service 120 sends the notification to personal electronic device 126 to notify consumer 124 that the label of interest was detected, notification service 120 sends the notification to an application, service, server, or device in customer cloud 114 which in turn sends a notification to personal electronic device 126 to notify consumer 124 that the label of interest was detected. Thus, there is no requirement notification service 120 notify electronic device 126 or consumer 124. The responsibility of notifying consumer 124 may that of customer cloud 114, for example. For example, upon notification service 120 notifying an application, service, server, or device in customer cloud 114 that the label of interest was detected, customer cloud 114 may cause a separate notification (e.g., an email message, an SMS message, or a push notification) to be received by electronic device 126 that informs consumer 124 that the label of interest was detected.

While in some variations such as depicted in FIG. 1 the analyzed video stream is a live video stream that originates from camera-equipped electronic device 102 that optically captures live video and streams the captured video to stream processor 112 in real-time, the analyzed video stream may originate from another type of electronic device. For example, the analyzed video stream may be video that has been stored at or downloaded to a personal electronic device (e.g., in a file), a server, or an edge device that is streamed (uploaded) to stream processor 112. Thus, there is no requirement that the video streamed to stream processor 112 be live video captured by a camera-equipped electronic device. Accordingly, while examples herein are provided in the context of live video streamed from a camera-equipped electronic device, the disclosed techniques are not exclusive to that context.

In some variations, an edge device (e.g., camera 102) performs pre-processing on video before it is streamed to stream processor 112. For example, the edge device may crop captured video frames and stream the cropped video frames to stream processor 112. The edge device may crop the video frames to a selected region of interest. For example, the selected region of interest may correspond to a selected portion of a camera's field of view. For example, the selected portion may correspond to the front doorstep of a home where the entire front yard of the home is within a camera's field of view. By cropping the video frames this way, the video analysis performed by computer vision service 118 can be constrained or focused on video activity within the selected portion of the camera's field of view while ignoring video activity outside the selected portion. This may be useful to reduce the occurrence of false positives or undesired notifications. For example, the user may be interested only when packages are dropped on the front doorstep. By cropping the video frames to just the front doorstep area within the camera's field of view, the user will not receive notifications for packages that appear within the camera's field of view but outside the front doorstep area such as, for example, when a delivery person walks by the user's home carrying a package on the way to a neighbor's house.

Returning to the top of FIG. 1, a provider network 100 generally adheres to a "cloud" computing model that enables ubiquitous, convenient, on-demand network access to a shared pool of configurable resources such as networks, servers, storage applications, and services. The resources can be rapidly provisioned and released with minimal management effort or service provider interaction. A customer of provider network 100 may be able to unilaterally provision computing capabilities in provider network 100, such as server time and network storage, as needed automatically without requiring human interaction with each service provider. Capabilities of provider network 100 may be available over intermediate network(s) 106 and accessed through standard mechanisms that promote use by heterogeneous thin or thick client platforms such as mobile phones, tablets, laptops, and workstations. Computing resources such as storage, processing, memory, and network bandwidth in provider network 100 may be pooled to serve multiple customers using a multi-tenant model, with different physical and virtual resources dynamically assigned and reassigned according to customer demand There may be a sense of location independence in that the customer generally may have no control or knowledge over the exact location of provided resources but may be able to specify location at a higher level of abstraction such as, for example, at the level of a country, state, or datacenter. Provider network 100 may automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the customer of a utilized service.

Provider network 100 may provide its capabilities to customers according to a variety of different service models including Software-as-a-Service ("SaaS"), Platform-as-a-Service ("PaaS"), and Infrastructure-as-a-Service ("IaaS"). With SaaS, a capability is provided to a customer using the provider's software applications running on the infrastructure of provider network 100. The applications may be accessible from various client devices through either a thin client interface such as a web browser, or a program interface. The infrastructure includes the hardware resources such as server, storage, and network components and software deployed on the hardware infrastructure that are necessary to support the services being provided. Typically, under the SaaS model, the customer does not manage or control the underlying infrastructure including network, servers, operating systems, storage, or individual application capabilities, except for limited user-specific application configuration settings. With PaaS, the customer is provided the capability to deploy onto hardware and software infrastructure of provider network 100 customer-created or acquired applications using programming languages, libraries, services, and tools supported by the provider or other sources. Typically, under the PaaS model, the customer does not manage or control the underlying hardware and software infrastructure including network, servers, operating systems, or storage, but has control over the deployed applications and possibly configuration settings for the application-hosting environment. With IaaS, the customer is provided the capability to provision processing, storage, networks, and other fundamental computing resources where the customer can deploy and run arbitrary software, which can include operating systems and applications. The customer does not manage or control the underlying hardware and software infrastructure but has control over operating systems, storage, and deployed applications and possibly limited control of selecting network components such as, for example, host firewalls.

Provider network 100 may provide its capabilities to a customer according to a variety of different deployment models including as a private cloud, as a community cloud, as a public cloud, or as a hybrid cloud. In a private cloud, the hardware and software infrastructure of provider network 100 is provisioned for exclusive use by a single organization which may comprise multiple customers (e.g., business units). The private cloud may be owned, managed, and operated by the organization, a third party, or some combination of them, and it may exist on or off premises 104. In a community cloud, the hardware and software infrastructure of provider network 100 is provisioned for exclusive use by a specific community of customers from organizations that have shared concerns such as mission security requirements, policy, and compliance considerations. The community cloud may be owned, managed, and operated by one or more of the organizations in the community, a third party, or some combination of them, and it may exist on or off premises 104. In a public cloud, the infrastructure is provisioned for open use by the public. The public cloud may be owned, managed, and operated by a business, academic, or government organization, or some combination of them. A public cloud exists on the premises of the public cloud provider. In a hybrid cloud, the infrastructure is a composition of two or more distinct cloud infrastructures (private, community, or public) that remain unique entities, but are bound together by standardized or proprietary technology that enables data and application portability such as, for example, cloud bursting for load balancing between clouds.

To provide resource services to customers, provider network 100 may rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across intermediate network(s) 106 (e.g., the Internet, a cellular network, etc.) via an interface, such as through use of an application programming interface (API) call, via a console implemented as a website or application, etc. An API refers to an interface or communication protocol between a client and a server, such that if the client makes a request in a predefined format, the client should receive a response in a specific format or initiate a defined action. In context of provider network 100, an API provides a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Camera-equipped electronic device 102 is representative of each of one or more camera-equipped electronic devices that may be located at a premises (e.g., premises 104.) Camera 102 may be a smart camera that includes an image sensor (e.g., a charge-coupled device (CCD sensor) or active-pixel sensor (CMOS sensor)), image digitization circuitry, image memory, a processor (e.g., a Digital Signal Processor (DSP) or general-purpose microprocessor), program and data memory, and a data communications interface (e.g., a serial interface or a wired or wireless Ethernet interface).

While in some embodiments camera 102 is used for unattended surveillance of premises 104 (e.g., a home or an office), camera 102 is used for automated inspection for quality insurance or part sorting and identification on an assembly or in a warehouse, packaging facility, or shipping facility in other embodiments. Another use of camera 102 is in a classroom or exam or test taking facility.

Camera 102 may be a component of or operatively coupled to a smart device or a smart appliance such as, for example, a smartphone, a smart car, a smart thermostat, a smart doorbell, a smart lock, a smart refrigerator, or other smart electronic device. Camera 102 may connect to intermediate network(s) 106 at premises 104 via a wireless data communications protocol such as, for example, BLUETOOTH, ZIGBEE, NFC, WI-FI (802.11), LIFI, 5G, etc. While in some embodiments camera 102 is connected to intermediate networks(s) 106 at premises 104 via a wireless data communications interface, camera 102 is connected to intermediate network(s) 106 at premises 104 via a wired data communications interface such as, for example, wired Ethernet (802.3), Universal Serial Bus (USB), serial (e.g., RS-232, RS-422, RS-423), FIREWIRE, etc.

Premises 104 represents any physical geographic location such a house, an office, or warehouse, or other physical geographic location where camera 102 is located. Premises 104 may be geographically remote from provider network 100 (e.g., separated by miles). However, premises 104 and provider network 100 can be at the same physical geographic location (e.g., same building, facility, or data center) such as in a private cloud, a community cloud, or a hybrid cloud configuration. One or more cameras (e.g., camera 102) may be positioned on premises 104. Camera 102 may have a fixed position on premises 104. However, camera 104 may be moveable or rotatable. For example, camera 104 may be attached to a flying drone at premises 104 or affixed to a moveable or rotatable mount that allows for manual or automated repositioning of camera 102 at premises 104. Camera 102 can also be a security camera, a body-worn camera, a smartphone camera, or a dashboard camera. In the case where camera 102 is affixed to a moving object such as a person, drone, or vehicle, then premises 104 may not correspond to just one physical geographic location but instead may corresponding to many different physical geographic locations over time as premises 104 and camera 102 moves from one physical geographic location to another.

Intermediate network(s) 106 may encompass any data communication network or combination of data communications networks suitable for connecting camera 102 to provider network 100. For example, intermediate network(s) 106 may include one or more of a Local Area Network (LAN), a Wide-Area Network (WAN), a cellular network, the Internet, etc. In some embodiments, intermediate network(s) 106 support the Internet Protocol (IP) at the Network Layer and the Hypertext Transfer Protocol (HTTP) at the Application Layer.

It should be noted that if there are multiple cameras or other smart devices at premises 104, devices may be connected to each other and can send data and information to each other for coordination or other purposes. For example, a smart smoke detector may send a network message to camera 102 upon detecting smoke at premises 104. Upon receiving the message, camera 102 may initiate the capture of video of premises 104. As another example, a smart baby monitor device may send a network message to camera 102 upon detecting the sound of a baby crying. Upon receiving this message, camera 102 may initiate the capture of video of premises 104.

Smart devices at premises 104 may be interconnected at premises 104 via a data communications network at premises 104 which in turn is connected to intermediate network(s) 106. The data communications network at premises 104 that interconnects the smart devices can be a suitable wired or wireless. Wired Ethernet is one example of a suitable wired network for interconnecting smart devices at premises 104. BLUETOOTH, ZIGBEE, NFC, WI-FI, and LIFI are examples of a suitable wireless network.

Labels 108 represent objects, concepts, events, or activities of interest that consumer 124 may wish to have the system recognize in video captured by camera 102. In the example of FIG. 1, labels 108 are depicted as a person, a pet, or a package. However, other types of labels may be recognized, and no particular set of labels is required. In some embodiments, a label that belongs to a particular class of labels is recognized. As used herein, the term "label," as in a label recognized in video captured by camera 102, may be used to refer to both a class of objects (e.g., pets), concepts (e.g., sunsets), events (e.g., weddings), or activities (e.g., riding a bike) recognized in video captured by a camera and the particular object, concept, event, or activity (instance) recognized in the video.

Labels may be hierarchical according to label ontology. A request received by computer vision service 118 to analyze video captured by camera 102 may indicate a "target" label that computer vision service 118 is to attempt to recognize in the video. The target label may be located at a position within the label hierarchy such that the label may have one or more ancestor labels in the hierarchy if the label is not a root label in the hierarchy. If the target label is recognized in the video by computer vision service 118, then all ancestors of the target label in the hierarchy may also be recognized. For example, if the target label is "dog" and there is a hierarchy of "mammal" "placental" "carnivore" "canine" "dog" "working dog" "husky" in the label hierarchy, then if a husky is recognized in the video by computer vision service 118, then all ancestor labels of the target label (e.g., canine, carnivore, placental, and mammal) may also be considered to be recognized. Recognized descendants in the hierarchy of the target label may also be recognized. Returning to the example, since computer vision service 118 recognized a husky in the video, then husky and working dog may also be recognized in addition to dog, canine, carnivore, placental, and mammal.

Techniques herein involve familiar and unfamiliar label recognition and unique label recognition. A unique label is a label that belongs to class of labels with only one member. A request received by computer vision service 118 to analyze video captured by camera 102 may indicate a target label that computer vision service 118 is to attempt to recognize unique instances of in the video. For example, if the target label is "dog," then computer vision service 118 will attempt to recognize all probabilistically unique instances of a dog in the analyzed video. A familiar label is a unique label that belongs to a set of known unique labels. A request received by computer vision service 118 to analyze video captured by camera 102 may indicate a target label that computer vision service 118 is to attempt to recognize familiar instances of in the video. For example, if the target label is "dog," then computer vision service 118 will attempt to recognize all probabilistically unique and known instances of a dog in the analyzed video.

As an example of the differences between familiar and unfamiliar label recognition and unique label recognition, consider a request for familiar and unfamiliar label recognition and a request for unique label recognition where in both requests the target label is "dog." In this case, with the request for familiar and unfamiliar label recognition, a dog recognized in the analyzed video is recognized as a familiar label if it can be determined that the recognized dog belongs to predetermined set of known dogs. In some embodiments, this determination is performed by extracting features from the video frame in which the recognized label appears and comparing the extracted features to predetermined features of a set of one or more known unique labels. For example, the result of analyzing the video might indicate that consumer 124's pet dog "Fido" was recognized at second 2 of the analyzed video.

With the example request for unique label recognition, each unique dog recognized in the analyzed video is recognized as a unique label regardless of if the dog is known. In some embodiments, unique label recognition is performed by extracting features from the video frame in which a recognized label appears and comparing the extracted features to features extracted for other labels recognized in the analyzed video to determine if the extracted features are unique from the features extracted for the other labels. For example, the result of analyzing the video might indicate that "unique dog-1" was recognized at second 2 of the analyzed video, and that "unique dog-2" was recognized at second 5 of the analyzed video where "unique dog-1" and "unique dog-2" are not the same dog.

API endpoint 110 of stream processor 112 is a point of entry to an API of stream processor 112. API endpoint 110 may be used by camera 102 and other electronic devices to make requests over intermediate network(s) 106 of the services and resources of stream processor 112. Such services and resources may include the ability to receive and ingest a video stream sent from camera 102 over intermediate network(s) 106 to stream processor 112 using API endpoint 110. When making requests of stream processor 112 via API endpoint 110 for services or resources such as a request by camera 102 to stream video to stream processor 112, API endpoint 110 may be used with a networking protocol designation (e.g., HTTPS) in a Uniform Resource Locator (URL). An example of an API endpoint 110 is the Doman Name Service (DNS) name "kinesis.us-west-1.amazonaws.com." Here, the API endpoint refers to the AMAZON KINESIS stream processing service in the United States West region of AMAZON WEB SERVICES. This example API endpoint may be used in a URL with the HTTPS networking protocol designation to request services and resources of the stream processing service using the Secure HyperText Transfer Protocol (HTTPS).

The API of stream processor 112 that is accessible via API endpoint 110 may conform to a particular communication style. Possible styles that may be used are the Representational State Transfer (REST) style, the Web Sockets style, or the like. The REST style is a stateless communication protocol that uses a request-response communication model. As such, a new network connection (e.g., a Transmission Control Protocol (TCP) connection) may be established for each HTTP or HTTPS request. The Web Sockets style is a stateful communication protocol and allows full duplex communication over a single network connection (e.g., a single TCP connection). Because of the overhead involved in establishing a network connection, a REST communication style is typically slower than a Web Sockets style in terms of the transmission of network messages. However, the stateless nature of REST reduces memory and buffering requirements for transmitted data. Whether the REST style or the Web Socket style is used by stream processor 112, data received by and send from stream processor 112 such as data sent between camera 102 and stream processor 112 may be encapsulated or formatted according to a data interchange format such as JavaScriptObject Notation (JSON), eXtensible Markup Language (XML), or the like.

Stream processor 112 is a service of provider network 100 that enables video and data to be streamed to and from stream processor 112 for processing. From the perspective of steam processor 112, a "stream producer" or just "producer" is a source that puts data or video into a video stream or a data stream. Camera 102 acts as a stream producer in some embodiments. A video stream is a resource that provides for the transportation of video data and possibly other types of data. For example, in addition to video, a video stream may carry audio or other time-encoded data streams such as, for example, depth sensing feeds, RADAR feeds. A "stream consumer" or just "consumer" gets data such as video, fragments, and frames from a video stream for the purpose of viewing, processing, or analyzing the data. In some embodiments, computer vision service 118 acts as a stream consumer.

In some embodiments, video carried in a video stream from camera 102 to stream processor 112 is encoded using the H.264 (MPEG-4) video coding standard or the like. H.264 (MPEG-4) is also known as Advanced Video Coding (AVC) and has superior bandwidth requirements, storage utilization, and download time compared to some other video codes. However, video codes other than H.264 (MPEG-4) may be used such as, for example, H.262 (MPEG-2), H.265(HEVC), VP8, VP9, or the like. The video stream may use a transport protocol to carry the video codec encoding video from camera 102 to stream processor 112 over intermediate network(s) 106. Suitable transport protocols include the Real-time Transport Protocol (RTP), WebRTC, or the like.

In some embodiments, camera 102 sends a video stream to stream processor 112 via API endpoint 110 as a stream of fragments. A fragment may be viewed as a self-contained sequence of video frames. That is, each P-frame (predicted video frame) and each B-frame (bidirectionally predicted video frame) of a fragment is not dependent on an I-frame (intraframe) in another fragment. Typically, the first frame of a fragment is an I-fame. Fragments may each correspond to approximately the same amount of video capture time. For example, each fragment may cover approximately between two and ten seconds of video capture time. Shorter or longer times or ranges are possible, and no particular amount of time is required.

As a video stream is received from camera 102, stream processor 112 may assign a unique identifier to each fragment of the video stream. Each fragment may be uniquely globally identifiable by its fragment identifier and an identifier of the video stream that contains the fragment. In some embodiments, stream processor 112 assigns identifiers to fragments of a video stream in increasing order such that a fragment that is earlier in time in the video stream will have a numerically lower fragment identifier than a fragment that is later in time in the video stream. In addition to buffering fragment identifiers of fragments buffered at stream processor 112, stream processor 112 may also buffer for each fragment a producer-side timestamp for the fragment corresponding to when the fragment was generated at or sent from a producer (e.g., camera 102) and a server-side timestamp for the fragment corresponding to when the fragment was received at stream processor 112.

Camera 102 may send video frames in a video stream to stream processor 112 in real-time as the video frames are generated at camera 102. This minimizes latency between generated the video frames and sending them to stream processor 112. Stream processor 112 may buffer and durably store a received fragment and related metadata in a "chunk." The metadata of a chunk for a fragment may include a server timestamp (a timestamp when stream processor 112 began receiving the fragment), a producer timestamp (a timestamp when a producer (e.g., camera 102) started recording the fragment), and the fragment identifier.

Before streaming video to stream processor 112, a producer (e.g., camera 102) may use API endpoint 110 to create a video stream for carrying the video from the producer to stream processor 112. In doing so, the producer may specify a data retention period for received fragments of the video stream. The data retention period governs how long stream processor 112 will durably store a received fragment at stream processor 112. In some embodiments, the data retention period is greater than or equal to zero. If zero, then stream processor 112 may not durably store a received fragment but may buffer it in memory for a short period of time (e.g., a few minutes) and while memory space of stream processor 112 is available. If greater than zero, then stream processor 112 may durably store the received fragment for the data retention period in addition to buffering the fragment in memory for a short period of time. Buffering the fragment in volatile computer memory at stream processor 112 is useful to be able to quickly provide the fragment from memory to a stream consumer that requests the fragment soon after it is received at stream processor 112 (e.g., within seconds or a few minutes) as volatile memory devices used for buffering typically have faster access characteristics that non-volatile memory used for durable data storage.

A consumer (e.g., computer vision service 118) may retrieve video from a video stream buffered or durably stored at stream processor 112. To do so, the consumer may identify the video stream from which to retrieve video in a request of stream processor 112. The consumer may send the request to stream processor 112 via API endpoint 110. The request may also indicate a starting chunk such as the latest or oldest chunk of the video stream; a specific chunk identified by the fragment identifier, the producer timestamp, or the server timestamp; or the chunk following where a previous request left off. Stream processor 112 then streams the buffered or durably stored chunks of the video stream to the consumer starting with the chunk indicated in the request.

Customer cloud 114 encompasses an application, server, service, or device of a customer of provider network 100 that runs on infrastructure of provider network in a public cloud, private cloud, community cloud, or hybrid cloud deployment configuration. For example, the customer may be an original equipment manufacturer of camera 102. The customer's application that runs in customer cloud 114 may provide limited or no support for label recognition and notification but may integrate with and use the services of stream processor 112 and computer vision service 118 of provider network via the API through API endpoints 110 and 116 to provide label recognition and notification to their consumers. For example, customer cloud 114 may offer an API endpoint to receive notification of a trigger event from camera 102 or another smart device as in Operation 3 of FIG. 1. The application of customer cloud 114 may use API endpoint 116 of computer vision service 118 to request analysis of video captured by camera 102 for label recognition and notification as in Operation 4 of FIG. 1. Additionally, the application of customer cloud 114 may access the final results of the analysis at data storage service 122.

As used herein, the term "customer" is used to refer to a customer of provider network 100. In some embodiments, a customer is an original equipment manufacturer or third-party provider of camera 102 or another smart device. The customer may use the services of provider network 100 to provide label recognition and notification for streaming video to their customers which are referred to herein as "consumers" or "end-users." Consumer 124 is an example of a consumer or an end-user. While in some embodiments a customer is a third-party provider of camera 102 to consumers, customer is a first-party provider of camera 102 to the operator of provider network 100. In both cases, with the techniques herein, the customer can leverage the stream processing capabilities of stream processor 112 and the computer vision processing capabilities of computer vision service 118 to provide real-time label recognition and notification for streaming video without having to build, deploy, and manage those capabilities on their own.

API endpoint 116 of computer vision service 118 is a point of entry to an API of computer vision service 118. API endpoint 116 may be used by an application in customer cloud 114 to make requests of the services and resources of computer vision service 118. Such services and resources may include the ability to analyze video and recognize labels in the video by applying a computer vision technique to the video. When making requests of computer vision service 118 via API endpoint 116 for services or resources such as a request by an application in customer cloud 114 to analyze video streamed to stream processing service 112 by camera 102, API endpoint 116 may be used with a networking protocol designation (e.g., HTTPS) in a Uniform Resource Locator (URL). An example of an API endpoint 116 is the Domain Name Service (DNS) name "recognition.eu-central-1.amazonaws.com." Here, the API endpoint refers to the AMAZON REKOGNITION computer vision service in central Europe. This example API endpoint may be used in a URL with the HTTPS networking protocol designation to request services and resources of the computer vision service using HTTPS.

Like the API of stream processor 112 that is accessible via API endpoint 110, the API of computer vision service 118 that is accessible via API endpoint 116 may conform to a particular communication style such as REST or Web Sockets. Likewise, data received by and send from computer vision service 118 via API endpoint 116 may be encapsulated or formatted accord to a data interchange format such as JSON, XML, or the like.

Computer vision service 118 can analyze a video stream consumed from stream processing service 112 by applying a set of one or more computer vision techniques to video frames of the video stream. A computer vision technique applied to video frames by computer vision service 118 may be based on deep machine learning or "deep learning." Computer vision service 118 may encompass a computer vision toolkit comprising a set of state-of-the-art computer vision machine learning models that can be rapidly and easily deployed. The models may be pre-trained to perform classification, detection, tracking tasks, and action recognition tasks. Label recognition as used herein refers to any one of or any combination of label classification, label detection, label tracking, and action recognition.

A label classification task performed by computer vision service 118 as applied to video captured by camera 102 may involve determining whether a target label is present in a set of one or more video frames (images). Such determination may be based on a deep learning computer vision model trained for label classification based on a library of pre-labeled images such as, for example, the IMAGENET image library or the like. More information on IMAGENET is available on the Internet in the image-net.org domain Instead of using a publicly available pre-labeled image library such as the IMAGENET library to train a label classification model, a pre-labeled image library that is collected and curated by provider network 100 may be used. Non-limiting examples of deep learning computer vision models on which label classification may be based include RESNET, RESNEXT, RESNEST, MOBILENET, VGG, SQUEEZENET, DENSENET, or the like.

A Residual Network, or "RESNET," learns residual functions with reference to layer inputs, instead of learning unreferenced functions. A RESNET lets stacked layers fit a residual mapping. In a RESNET, residual blocks are stacked on top of each other to form a network. For example, a RESNET-50 has fifty layers using residual blocks. There is empirical evidence that a RESNET is relatively easy to optimize and gains accuracy from increased network depth. More information on RESNET is available in the following papers: He et al., "Deep residual learning for image recognition," In Proceedings of the IEEE conference on computer vision and pattern recognition, pp. 770-778. 2016; and He et al., "Identity mappings in deep residual networks," In European Conference on Computer Vision, pp. 630-645, Springer, Cham, 2016.

A RESNEXT repeats a building block that aggregates a set of transformations with the same topology. Compared to a RESNET, a RESNEXT exposes a new dimension, cardinality (the size of the set of transformations), as a factor in addition to depth and width. More information on RESNEXT is available in the following papers: Xie et al., "Aggregated residual transformations for deep neural networks," In Computer Vision and Pattern Recognition (CVPR), 2017 IEEE Conference on, pp. 5987-5995, IEEE, 2017; and Hu et al., "Squeeze-and-excitation networks," arXiv preprint arXiv:1709.01507 7 (2017).

A RESNEST is a variant on a RESNET, which instead stacks Split-Attention blocks. The cardinal group representations are then concatenated along a channel dimension. As in standard residual blocks, the final output of the Split-Attention block is produced using a shortcut connection, if the input and output feature-map share the same shape. For blocks with a stride, an appropriate transformation is applied to the shortcut connection to align the output shapes. More information on RESNEST is available in the paper by Zhang et al., "ResNeSt: Split-Attention Network," arXiv preprint (2020).

A MOBILENET is a class of efficient models for mobile and embedded vision applications. A MOBILENET is based on a streamlined architecture that uses depth-wise separatable convolutions to build light weight deep neural networks. More information on MOBILENETS is available in the follow papers: Howard et al., "Mobilenets: Efficient convolutional neural networks for mobile vision applications," arXiv preprint arXiv:1704.04861 (2017); Sandler et al., "Inverted Residuals and Linear Bottlenecks: Mobile Networks for Classification, Detection and Segmentation," arXiv preprint arXiv:1801.04381 (2018); and Howard et al., "Searching for mobilenetv3," arXiv preprint arXiv: 1905.02244 (2019).

A VGG is a convolutional neural network architecture. A VGG utilizes small 3 by 3 filters and utilizes a relatively simple architecture of pooling layers and a fully connected layer. More information on VGG is available in the paper by Simonyan et al., "Very Deep Convolutional Networks for Large-Scale Image Recognition," arXiv technical report arXiv:1409.1556 (2014).

A SQUEEZENET is a convolutional neural network that employs design strategies to reduce the number of parameters with the use of fire modules that "squeeze" parameters using 1 by 1 convolutions. More information on SQUEEZENET is available in the paper by Iandola et al., "Squeezenet: Alexnet-level accuracy with 50× fewer parameters and <0.5 mb model size," arXiv preprint arXiv: 1602.07360 (2016).

A DENSENET is convolutional neural network that utilizes dense connections between layers, through Dense Blocks, in which all layers with matching feature-map sizes are connected with each other. To preserve the feed-forward nature, each layer obtains additional inputs from all preceding layers and passes on its own feature-maps to all subsequent layers. More information on DENSENET is available in the paper by Huang et al., "Densely Connected Convolutional Networks," In CVPR, vol. 1, no. 2, p. 3. 2017.

A label detection task performed by computer vision service 118 as applied to video captured by camera 102 may involve determining one or more target labels are present in a set of one or more video frames (images) and their locations in the frames. The locations may be indicated by bounding boxes, bounding polygons, or the like. Such determination may be based on a deep learning computer vision model trained for label detection based on a library of pre-labeled images such as, for example, the MICROSOFT COCO image library or the like. More information on the MICROSOFT COCO pre-labeled image library is available in the paper by Lin et al, "Microsoft COCO: Common Objects in Context," arXiv:1405.0312 (2014). Alternatively, a pre-labeled image library that is collected and curated by provider network 110 may be used. Label detection performed by computer vision service 118 may be based on an approach for object detection. Current approaches for object detection can be characterized into two main types: one-stage methods and two-stage methods. One-stage methods prioritize inference speed. Non-limiting examples of one-stage models include YOLO and SSD. Two-stage methods prioritize detection accuracy. A non-limiting example of a two-stage model is FASTER R-CNN.

YOLO stands for "You Only Look Once" in which object detection is framed as a regression problem to spatially separated bounding boxes and associated label probabilities. A YOLO architecture encompasses a single neural network that predicts bounding boxes and class probabilities directly from video frames or images in one evaluation. More information on YOLO is available in the paper by Redmon et al, "Yolov3: An incremental improvement," arXiv preprint arXiv:1804.02767 (2018).

SSD stands for "Single-Stage object Detection". In SSD, the output space of bounding boxes is discretized into a set of default boxes over different aspect ratios. SSD also scales per feature map location. At inference time, an SSD architecture generates scores for the presence of each label category in each default box and produces adjustments to the box to better match the label shape. Addition, an SDD network combines predictions from multiples feature maps with different resolutions to handle labels of various sizes. More information on SSD can be found in the paper by Liu et al, "SSD: Single Shot MultiBox Detector," ECCV 2016.

Faster R-CNN utilizes a region proposal algorithm to hypothesize about label locations. Faster R-CNN uses a region proposal network that shares full-image convolutional features with a detection network to enable reduced-cost region proposals. More information on Faster R-CNN can be found in the paper by Ren et al, "Faster r-cnn: Towards real-time object detection with region proposal networks," In Advances in neural information processing systems, pp. 91-99. 2015.

A label tracking task performed by computer vision service 118 as applied to video captured by camera 102 may involve determining whether a target label is present in video and then tracking the target label it moves around frames in the video. Computer vision service 118 may be configured to perform the label tracking task within video from a single camera and with video across non-overlapping cameras.

For label tracking within video from a single camera, computer vision service 118 may use a generative tracking technique that accounts for occlusion, scale change, and shape deformation as the tracked label moves across video frames. A generative tracking technique estimates a target label's location and correspondence through iteratively searching the most similar target candidate with the minimal reconstruction error. During the iterative search, a Kalman filtering, a particle filtering, or a kernel-based tracking method may be used to localize the search Kalman filtering is useful for real-time tracking but is constrained to linear target state transition and Gaussian noise distributions and may lose a tracked label when the label is occluded. A non-limiting example of a generative tacking technique that uses is Kalman filtering is described in the paper by Jang et al, "Active models for tracking moving objects," Pattern Recogn, 33(7), 1135-1146 (2000). Particle filtering benefits from non-linear/non-Gaussian tracking and multi-modal processing but can have high-computational complexity. A non-limiting example of a generative tracking technique with particle filtering is described in the paper by Cong et al, "Robust visual tracking via MCMC-based particle filtering," IEEE Int. Conf. Acoustics, Speech and Signal Processing, Tokyo, Japan, March 2012. Kernel-based tracking supports real-time tracking but also may have difficulty with long-term total label occlusion. A non-limiting example of a generative tracking technique using kernel-based tracking is described in the paper by Liu et al, "Eigenshape kernel based mean shift for human tracking," IEEE Int. Conf. Computer Vision Workshops, Barcelona, Spain, November 2011.

For label tracking within video from a single camera, computer vision service 118 may use a discriminative tracking technique that accounts for occlusion, scale change, and shape deformation as the tracked label moves across video frames. A discriminative tracking technique aims to separate target labels from the background through a classifier, and then jointly to establish the target labels' correspondences across video frames through a target association algorithm. One type of target association algorithm that may be used is known as joint probability data association filtering (JPDAF). JPDAF supports multi-target tracking subject to data association between a fixed number of tracked target labels. A non-limiting example of a discriminative tracking technique that uses the JPDAF type of target association algorithm is described in the paper by Rasmussen et al. "Probabilistic data association methods for tracking complex visual objects," IEEE Trans, Pattern Anal, Mach. Intell. 23(6), 560-576 (2001). Another type of target association algorithm that may be used is known as multiple-hypothesis tracking (MHT). MHT supports a variable number of target labels and under occlusion but with high computational complexity. A non-limiting example of a discriminative tracking technique that uses the MHT type of target association algorithm is described in the paper by Zaiga et al, "Real-time reliability measure-driven multi-hypothesis tracking using 2D and 3D features," ELTRASIP Journal on Advances in Signal Processing, no. 1, 2011, pp. 1-21. Yet another type of target association algorithm that may be used is known as flow network framework (FNF). FNF supports a variable number of target labels and under occlusion but cannot effectively handle long-time target label occlusion. A non-limiting example of a discriminative tracking technique that uses the FNF type of target association algorithm is described in the paper by Zhang et al, "Global data association for multi-object tracking using network flows," IEEE Conf. Computer Vision and Pattern Recognition, Anchorage, USA, June 2008.

For label tracking across non-overlapping cameras, computer vision service 118 may use a label re-identification technique, a camera-link model (CLM)-based technique, or a graph model (GM)-based technique. A label re-identification technique may aim to identify whether a label detected in video from one camera is the same as a label detected in video from another camera. Label re-identification may employ feature extraction or distance metric learning. With feature extraction, extracting discriminative and robust visual features can help to improve label re-identification accuracy but involves the complexity of using a suitable feature combination to effectively describe label appearance. A non-limiting example of label re-identification using color features is described in the paper by Cheng et al, "Matching of objects moving across disjoint cameras," IEEE Int. Conf. Image Processing, Atlanta, USA, October 2006. Other feature types may be used in feature extraction-based label re-identification including texture, shape, global features, regional features, patch-based features, and semantic features. Distance metric learning helps to mitigate variations in cross-view label appearances but with the difficulty of building a training dataset. A non-limiting example of a distance metric learning approach is described in the paper by Liao et al, "Person re-identification by local maximal occurrence representation and metric learning," IEEE Conf. Computer Vision and Pattern Recognition, Boston, MA, USA, June 2015. CLM-based tracking aims to track labels through establishing a link (correlation) model between two adjacent or among multiple neighboring cameras. CLM-based tracking can be based on supervised-learning or unsupervised-learning. With supervised learning, it may be relatively easy to learn the CLM model provided a suitable labeled training dataset is available. Unsupervised learning approaches do not require a labeled training dataset, but estimated CLM may decrease accuracy due to higher outlier percentage. GM-based tracking aims to track labels through partite graph matching based on input observations such as detections, tracklets, trajectories, or pairs. GM-based tracking may employ a maximum a posteriori (MAP) optimization solution framework to facilitate label tracking in complex scenes such as occlusion, crowd, and interference of appearance similarity, but with potential difficulty of arriving at an optimal solution. A non-limiting example of CLM-based tracking is described in the paper by Ristani et al, "Performance measures and a data set for multi-target, multi-camera tracking," European Conf. Computer Vision, 2016. A non-limiting example of GM-based tracking is described in the paper by Chen et al, "Integrating social grouping for multi-target tracking across cameras in a CRF model," IEEE Trans. Circuits and Systems for Video Technology. dol:10.110911'CSVT.2016.2565978.

An action recognition task may be performed by computer vision service 118 as applied to video captured by camera 102. In some embodiments, computer vision service 118 performs the action recognition task using a trained deep convolutional neural network. One non-limiting example of using a training deep convolution neural network to perform action recognition is described in the paper by Wang et al, "Temporal Segment Networks: Towards Good Practices for Deep Action Recognition," In European Conference on Computer Vision (ECCV), 2016.

While in some variations a machine learning model used for label classification, label detection, label tracking, or action recognition is trained and used for inference by computer vision service 118, a machine learning model used for label classification, label detection, label tracking, or action recognition is trained by computer vision service 118 but is used for inference at an edge device such as, for example, camera-equipped electronic device 102. For example, the edge device may be able to download a pre-trained machine learning model and associated inference software from provider network 100 or computer vision service 118 (e.g., via API endpoint 116). The pre-trained machine learning model may be trained to recognize a particular type of label such as, for example, a person, pet, or package. The edge device may use the pre-trained machine learning model to analyze video before streaming the video to stream processor 112. For example, in response to a trigger event (e.g., motion in front of camera 102), camera 102 may apply the pre-trained machine learning model to captured video to conduct a preliminary analysis of the video to determine if there is a label of interest in the captured video. If the result of the preliminary analysis is that there is probably a label of interest in the capture video, then camera 102 may begin streaming the captured video to stream processor 112 for additional analysis of the captured video by computer vision service 118. If there result of the preliminary analysis is that the label of interest is probably not in the captured video, then camera 102 may forego streaming the captured video to stream processor 112 to avoid consuming bandwidth of intermediate network(s) 106 or processor cycles of camera device 102.

Computer vision service 118 may be configured to receive an analysis request via API endpoint 116 from customer cloud 114. The analysis request is carried in one or more Secure-HyperText Transfer Protocol (HTTPS) requests from customer cloud 114 to API endpoint 116 in some embodiments. The analysis request may request computer vision service 118 to analyze an input video stream that will be streamed to, was streamed to, or is currently being streamed to stream processing service 112. For example, a computing process or an executing software application in customer cloud 114 may send an analysis request to computer vision service 118 using API endpoint 116 in response to receiving notification of a trigger event from camera 102. Camera 102 may send the notification of the trigger event in response to detecting the trigger event or in response receiving notification of the trigger event from another smart device at premises 104.

The trigger event may be various. For example, the trigger event may be motion detected by camera 102. Camera 102 may detect motion in a variety of different ways including by passive infrared (PIR), active infrared, microwave, or ultrasonic radiation. Upon detecting motion or other trigger event, camera 102 may begin capturing video, may stream the captured video to stream processor 112, and may send notification of the trigger event to customer cloud 114. In response to receiving the notification of trigger event, customer cloud 114 may send an analysis request to computer vision service 118 to analyze the captured video streamed to stream processor 112 from camera 102. Other possible trigger events include detection of smoke, detection of carbon monoxide, or detection of another environmental hazard. For example, camera 102 may be a smart smoke detection electronic device or a smart carbon monoxide detection electronic device integrated with a smart camera. Or a smart smoke detector or a smart carbon monoxide detector at premises 104 may be connected to camera 102 via a mesh network or other network and send a notification to camera 102 when smoke or carbon monoxide is detected. Another possible trigger event is detection of sound such as the sound of a baby or a child crying or the sound of certain spoken utterances. For example, camera 102 may be part of, integrated with, or connected to a smart electronic baby monitoring device. Or camera 102 may be part of, integrated with, or connected to a smart home digital assistant device that can receive and respond to voice commands from a person nearby the device. For example, camera 102 may begin capturing video, may stream the captured video to stream processor 112, and may send notification of the trigger event to customer cloud 114 in response to a smart home digital assistant device detecting a spoken utterance of "HELP," "START CAMERA," or other relevant spoken utterance.

In any case, in response to receiving notification of a trigger event, customer cloud 114 may send an analysis request to computer vision service 118. The analysis request may identify an input video stream at stream processor 112 to be analyzed. The analysis request may specify an analysis to perform on the input video stream. In some embodiments, the analysis is one of label recognition, familiar and unfamiliar label recognition, unique label recognition, or label recognition across non-overlapping cameras. To perform the analysis, computer vision service 118 may act as a stream consumer with respect to stream processor 112 and consume the input video stream from stream processor 112 in chunks. Video frames of each fragment of each chunk can be processed by computer vision service 118 to conduct the specified analysis.

It should be noted that where label recognition across non-overlapping cameras is the analysis requested, then the analysis request may specify two input video streams to be analyzed corresponding to the non-overlapping cameras. For example, a home might have two smart cameras: (1) a doorbell camera with a field of view that includes an area outside the front door, and (2) another smart camera with a field of view that does not overlap the doorbell camera and includes the driveway area of the home leading toward the front door. In this case, the cameras may separately detect a trigger event and separately begin capturing video and streaming the video to stream processor 112 in separate video streams. Both cameras may notify customer cloud 114 of their respective trigger events and customer cloud 114 may request computer vision service 118 to analyze the input video streams from both non-overlapping cameras at stream processor 112. For example, customer cloud 114 may request non-overlapping camera analysis when trigger event notifications are received from both cameras within a threshold amount of time, or when a trigger event notification is received from the doorbell camera within a threshold amount of time of an earlier trigger event notification received from the driveway camera which may occur when a person approaches the front door of the home from the street or sidewalk on a path through the driveway.

During the analysis of an input video stream, computer vision service 118 may output results of the analysis to an output data stream at stream processor 112. Another process such as, for example, an application, server, service, or device in customer cloud 114 can consume data from the output data stream at stream processor 112. In other words, computer vision service 118 can be a stream producer and customer cloud 114 can be a stream consumer with respect to the output data stream at stream processor 112. In addition to or instead of outputting results of the analysis to an output data stream at stream processor 112, computer vision service 118 may output results of the analysis to a data storage container in data storage service 122. The data storage container may contain the results of the analysis in data storage service 122 as a set of one or more data storage objects (e.g., as a set of one or more files and any associated metadata).

In some embodiments, results of the analysis of the input video stream are output to the output data stream at stream processor 112 as the results become available or are determined at computer vision service 118. By doing so, a stream consumer of the output data stream at stream processor 112 (e.g., a process or an application in customer cloud 114) can be notified of the result before computer vision service 118 has completed the analysis of the input video stream. Once computer vision service 118 has completed the analysis of the input video stream, all results of the analysis may be output to a data storage container in data storage service 122. The results output to the data storage container in data storage service 122 may be more comprehensive than result notifications output to the output data stream at stream processor 112. For example, if the analysis request is to recognize a pet in the input video stream, then computer vision service 118, upon detecting a dog in a video fragment of the video stream, may output a result to the output data stream indicating that a dog was recognized and including a video frame or a cropped image in which the dog appears. Computer vision service 118 may output this to the output data stream before it has completed its analysis of the input video stream. When computer vision service 118 has completed its analysis of the input video stream, computer vision service 118 may output a video fragment to a data storage container in data storage service 122 in which movement of the dog across the video frames of the fragment is tracked by a bounding box or a bounding polygon around the dog that appears in the output video fragment. Thus, a process or an application of customer cloud 114 can take action such as, for example, a notification action on a result of the analysis of the input video stream soon after the result is available in the output data stream and before the analysis of the input video stream is complete.

Results of the analysis may be output by computer vision service 118 to notification service 120, in addition to or instead of outputting results of the analysis to an output data stream at stream processor 112 or a data storage container at data storage service 122. Notification service 120 may be a channel-based (topic-based) publish-subscription system and event-driven computing service for asynchronous application-to-application and application-to-person communication. Notification service 120 supports event-driven computing in which "subscriber" services or just "subscribers" automatically perform work in response to events triggered by "publisher" services or just "publishers". Notification service 120 may allow a publisher to publish an event message to a set of one or more subscribers through the use of message channels (sometimes called messages topics). A message channel is like a message queue in that it is an asynchronous service-to-service communication mechanism in which event messages are stored in the channel/queue until they are processed and deleted. However, a message channel may differ from a message queue in some ways depending on the type of message channel. With a standard message channel, event messages may be delivered by notification service 120 to a subscriber in a different order than the order in which they were published to the standard message channel. In other words, for a standard message channel, notification service 120 may make a best effort but not guarantee to deliver event messages in the same order in which they were published to the message channel. Furthermore, with a standard message channel, an event message may be delivered more than once to a subscriber. In other words, for a standard message channel, notification service 120 may make a best effort but not guarantee to deliver only one copy of a published event message to a subscriber. Another type of message channel is a FIFO message channel. A FIFO message channel is like a standard message channel except that first-in-first-out ordering is guaranteed by notification service 120 and event message deduplication within a sliding window of time may be provided by notification service 120. In both cases of a standard message channel and a FIFO message channel, notification service 120 may support delivery of event messages to a variety of different subscriber endpoint types including server-less compute functions, webhooks, short message service (SMS) services, mobile push services, and electronic mail (e-mail) services. Also in both cases, notification service 102 may support event message fanout where a single event message published to a message channel is delivered by notification service 120 to multiple subscribers. A standard message channel may support fanout to more subscribers than a FIFO message channel given the looser constraints on ordering and deduplication.

In some embodiments, an analysis request of computer vision service 118 specifies a message channel of notification service 120. The message channel can be a standard message channel or a FIFO message channel. The type of message channel used can be selected according to the requirements of the particular implementation at hand. For example, if a subscriber can tolerate out-of-order event notifications and duplicate event notifications, then a standard message channel may be used to process a high volume of event notifications. The analysis request may specify the message channel by a name or identifier of the message channel. Computer vision service 118 may publish results of the analysis to the message channel as recognition event messages. For example, a recognition event message may indicate that computer vision service 118 detected a particular label (e.g., a person, pet, or package) in the input video stream. Computer vision service 118 may also publish another event message to the message channel when computer vision service 118 has completed the requested analysis of the input video stream.

Data storage service 122 may provide data object storage through a web service interface or API endpoint. A basic unit of storage in data storage service 122 may be objects. Objects may contain user data such as analytics data, log files, application data, videos, images, backup data, archival data, etc. Objects may be organized into buckets to which access control, replication, encryption, and other operations may be applied.

Consumer 124 represents the end-user consumer of camera 102. For example, consumer 124 may the homeowner of premises 104 that has purchased camera 102 for home security purposes. Personal electronic device 126 is used by consumer 124 to receive notifications reflecting the results of analysis performed by computer vision service 118 in video captured by camera 102 and streamed to stream processor 112. For example, consumer 124 may receive a SMS notification, an e-mail notification, a mobile push notification, or other type of notification at personal electronic device 126 reflecting the results of an analysis performed by computer vision service 118 on video captured by camera 102 and streamed to stream processor 112. For example, the notification might indicate that there is a package detected on the front doorstep of premises 104.

While in some embodiments stream processor 112, customer cloud 114, computer vision service 118, notification service 120, and data storage service 122 all operate on infrastructure provided by the same provider network (e.g., provider network 100), different provider networks are involved in other embodiments. For example, stream processor 112 and computer vision service 118 may reside in a first provider network, customer cloud 114 may reside in a second provider network, notification service 120 may reside in a third provider network, and data storage service may reside in a fourth provider network. All these provider networks may be connected via intermediate network(s) 106, for example.

Figure 2:
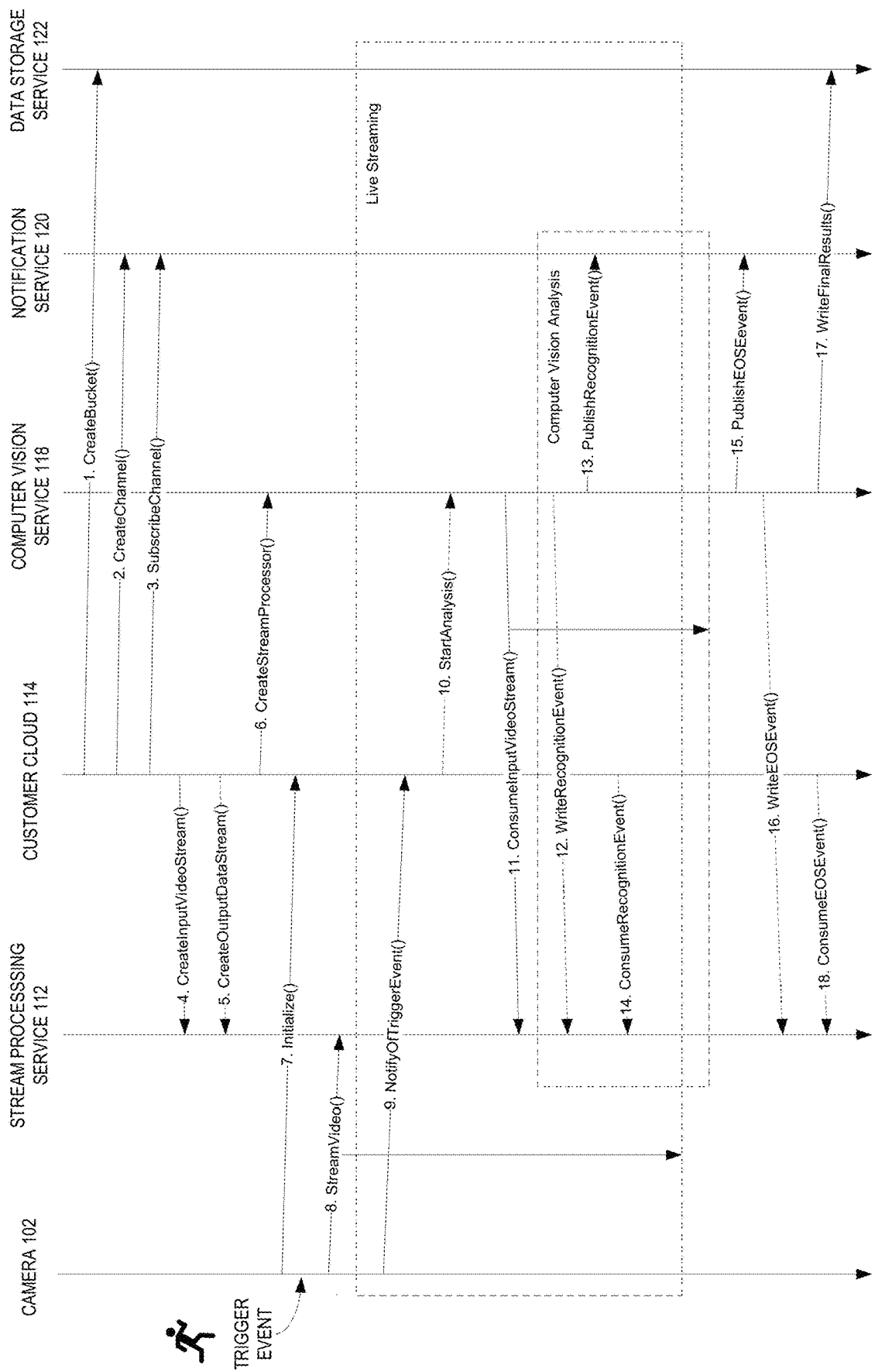
FIG. 2 illustrates interaction between various components in the environment of FIG. 1 for label recognition and notification for streaming video according to some embodiments.

FIG. 2 illustrates API interaction between various components in the environment of FIG. 1 for label recognition and notification for streaming video according to some embodiments. Some or all the operations (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory.

At Operation 1, an application in customer cloud 114 requests data storage service 122 to create a bucket in data storage service 122. The bucket is for receiving the results of analysis of video by computer vision service 118. In some embodiments, the results include a set of one or more video frames where a label of interest was recognized. The video frames may be annotated with bounding boxes or bounding polygons indicating the location of the label of interest in the video frames. The final results may instead or additionally include the raw video frames, or the raw video captured by the camera or cameras without bounding boxes or bounding polygons. In the case of a request to analyze video for label recognition across non-overlapping cameras, the final results may include video captured by camera with bounding boxes or bounding polygons around the label of interest that track the movement of the label within and across the video frames of the video from the non-overlapping cameras. With respect to any bounding box or bounding polygon, it may be associated with a label description such as "person," "pet", or "package" indicating the particular label recognized. Cropped images may also be included in the results. A cropped image may include the portion of a video frame where a label of interest was recognized. The final results may also include metadata about the analysis conducted such as, for example, an identifier of consumer 124 that owns or uses camera 102, timestamp information indicating when the analyzed video was captured or when the analysis was performed, camera information indicating the camera or cameras that captured the analyzed video, confidence information quantitatively or qualitatively indicating a confidence that the label recognized in the video frames is the label of interest, and session information identifying a video analysis session in which the video was analyzed by computer vision service 118.

At Operation 2, customer cloud 114 requests notification service 120 to create a message channel to which recognition events will be published by computer vision service 118. The message channel can be a standard message channel or a FIFO message channel according to the requirements of the particular implementation at hand and, in particular, depending on the requirements of the subscribers of the message channel for strict ordering and strict deduplication of event messages published to the message channel. A recognition event published to the message channel may indicate a label recognized in video analyzed by computer vision service 118 and an identifier of the video analysis session during which the label was recognized. Computer vision service 118 may establish a unique video analysis session, or just "session," for each analysis request. In doing so, computer vision service 118 may assign an identifier to each session such that label(s) recognized during the session can be correlated or associated with the session in which they were recognized along with other information associated with the session such as, for example, the input video stream(s) analyzed during the session, the camera(s) from which the input video streams were obtained, the consumer that owns or uses the camera(s), results (e.g., final results) of the analysis, etc.

In some embodiments, computer vision service 118 publishes a recognition event to the message channel the first time a label of interest is recognized in a video stream. For example, if computer vision service 118 recognizes a person at second 2 of the video stream, a pet a second 4 of the video stream, and a person again at second 5 of the video stream, then the computer vision service 118 may publish two recognition events to the message channel, one for the person recognized at second 2 and one for the pet recognized at second 4. However, a recognition event is not published for the person recognized at second 5 of the video stream. This provides an effective balance between notifying a subscriber to the message channel when a particular type of label is recognized in a video stream without overwhelming the subscriber with too many or unnecessary recognition events. In some embodiments, computer vision service 118 publishes an end-of-session event to the message channel when the computer vision service 118 has completed an analysis of the video stream. This may serve to notify a subscriber of the message channel that no further recognition events for the session will be published.

At Operation 3, customer cloud 114 may subscribe to the message channel created at operation 2. By doing so, customer cloud 114 may receive recognition events and end-of-session events published to the message channel by computer vision service 118 and take appropriate action on them. For example, customer cloud 114 may create and subscribe to the message channel for the analytic, notification, or other purposes.

At Operation 4, customer cloud 114 uses API endpoint 110 to create an input video stream at stream processor 112. At this point, the input video stream at stream processor 112 may not contain any video data as video data may have yet to be streamed into it from camera 102. The request to create the input video stream may specify parameters of the input video stream such as the retention period for video fragments, a name of the smart device that will be streaming video into the input video stream at stream processor 112, the type of video or media that will be streamed into the input video stream (e.g., H.264 video, H.264 video with AAC audio, or other IANA recognized video or media type), a name or identifier for the input video stream that will be used to reference the input video stream, and a set of one or more alpha-numeric key-value pairs to associated with the input video stream at stream processor 112. In some embodiments, as mentioned, if the retention period is specified as zero, then stream processor 112 may not durably store or persist video data streamed into the input video stream but may still buffer the video data in volatile data storage devices at stream processor 112 for a short period of time (e.g., five minutes) and while buffer memory is available. A value greater than zero may be used to specify the period of time (e.g., in seconds, minutes, or hours) stream processor 112 is to retain streamed video data in non-volatile data storage devices.

At Operation 5, customer cloud 114 uses API endpoint 110 to create an output data stream at stream processor 112. The output data stream may be used to receive results of the analysis of the input video stream by computer vision service 118. That is, as results become available while analyzing the input video stream, computer vision service 118 may write the results to the output data stream allowing a consumer of the output data stream to process the results in a stream processing fashion. The output data stream at stream processor 112 may be viewed as a set of sequenced data records, which may be buffered in volatile memory at stream processor 112 for a period of time or durably stored in non-volatile memory at stream processor 112 for a specified period of time. In some embodiments, for a given recognition event that occurs when analyzing video in response to an analysis request, computer vision service 118 publishes the recognition event to the message channel created at Operation 2 and writes the recognition even to the output data stream created at Operation 5. In some embodiments, for a given end-of-session event that occurs after analyzing video in response to an analysis request, computer vision service 118 publishes the end-of-session event to the message channel created at Operation 2 and writes the end-of-session event to the output data stream created at Operation 5.

At Operation 6, as part of an analysis request, customer cloud 114 uses API endpoint to create a stream processor at computer vision service 118. The request to create the stream processor may specify various parameters pertaining to conducting an analysis of video streamed from camera 102. In some embodiments, the request to create the stream processor may specify input parameters, output parameters, and analysis settings. The input parameters may specify the input video stream at stream processor 112 containing the video to be analyzed such as, for example, the input video stream created at Operation 4. The output parameters may specify the output data stream at stream processor 112 to which to write recognition events and the end-of-session event such as, for example, the output data stream created at Operation 5. The output parameters may also specify the data storage bucket to which to write the final results of the analysis such as, for example, the data storage bucket created at Operation 1. The output parameters may also specify the message channel at notification service 120 to which to publish recognition events and the end-of-session event such, as for example, the message channel created at Operation 3.

In some embodiments, the request to create the stream processor at Operation 6 specifies does not specify both an output data stream at stream processor 112 and a message channel at notification service 120 as part of the output parameters. For example, the request to create the stream processor may specify just a message channel at notification service 120 to which to publish recognition events and the end-of-session event. For example, there may be no data stream consumer such as, for example, customer cloud 114 that is configured to consume recognition and end-of-session events from an output data stream at stream processor 112. In this case, Operations 5. CreateOutputDataStream( ) 12. WriteRecognitionEvents( ) 14. ConsumeRecognitionEvents( ) 16. WriteEOSEvent( ) and 18. ConsumeEOSEvent( ) may not be performed. It should be noted that where no output data stream at stream processor 112 is consumed, customer cloud 114 and other subscribers can still be notified of recognition events and the end-of-session event by subscribing to the message channel at notification service 120.

The analysis settings of the request to create the stream processor at Operation 6 may specify the type of analysis to be conducted. In some embodiments, the types of analysis that can be conducted include label recognition, familiar and unfamiliar label recognition, unique label recognition, and label recognition across non-overlapping cameras.

For label recognition, the analysis settings may specify a set of one or more target labels to be recognized. Each target label in the set of target labels may be recognized in the analyzed video independently of each other and a recognition event may be written or published for each target label recognized in the video analyzed. In some embodiments, a recognition event is written or published by computer vision service 118 for only the first instance of a recognized label in the analyzed video. For example, if a person is recognized at second 2 of the analyzed video, a pet is recognized at second 5 of the analyzed video, and a person is recognized at second 9 of the analyzed video, then two recognition events may be written or published: one for the person recognized at second 2 and another for the pet recognized at second 5. In some embodiments, the analysis settings also specify a confidence threshold for each target label or for the set of target labels. In this case, computer vision service 118 will not recognize a label as a target label if the confidence score for the recognized label is below the confidence threshold. For example, the analysis settings might specify "person" as a target label with a confidence threshold of 95% (on a scale of 0% to 100%). In this case, if computer vision service 118 recognizes a label in the analyzed video with a confidence score of 85% that the recognized label is a person, then the computer vision service 118 will not write or publish a recognition event for the recognized label since the confidence score is below the threshold.

For familiar and unfamiliar label recognition, the analysis settings may specify a collection of one or more label descriptors for a target label such as person, pet, or face. A label descriptor may be a vector of numbers that represent image features of a unique label and with the property that label descriptors can be compared to each other according to a vector similarity or distance measure (e.g., cosine similarity, dot product, or Euclidean distance) such that label descriptors that are more similar/closer in distance are more likely to represent the same unique label and label descriptors that are less similar/farther apart in distance are less likely to represent the same unique label.

Computer vision service 118 will attempt to detect the target label in the video analyzed. If the target label is detected, then computer vision service 118 will extract features from the video frame(s) in which the target label was detected and attempt to match a label descriptor generated from the extracted features to at least one label descriptor in the specified collection. If there is a match, then the detected target label is a familiar label. If there is no match, then the detected target label is an unfamiliar label.

Computer vision service 118 may write or publish a recognition event when a familiar label is recognized and when an unfamiliar label is recognized. For example, the analysis settings might specify "pet" as the target label. In this case, if a known pet is recognized in the analyzed video, then computer vision service 118 may write or publish a recognition event indicating that a familiar pet was recognized in the analyzed video. On the other hand, if an unknown pet is recognized in the analyzed video, then computer vision service 118 may write or publish a recognition event indicating that an unfamiliar pet was recognized in the analyzed video.

The collection of label descriptors may be stored in provider network 110 accessible to computer vision service 118. The analysis settings may simply refer to the collection by a name or identifier of the collection without also specifying the label descriptors themselves. The collection of label descriptors may be generated by computer vision service 118 from a set of one or more images. For example, the set of images mays be provided by consumer 124. For example, the set of images may be of the pets or persons in consumer 124's family Each image may be annotated or associated with metadata (e.g., bounding polygon metadata) that identifies a region of the image that contains a familiar label such as a familiar person, pet, or face. Computer vision service 118 may generate the descriptors by extracting image features from the image containing the familiar label and generating a descriptor therefrom. The features extracted can include any of color features, orientation features, texture features, shape features, global features, regional features, patch-based features, semantic features, etc.

The match may be a probabilistic match based on a distance or similarity metric. The analysis settings may specify a distance or similarity threshold (e.g., 90% confidence, 99% confidence, etc.) to be considered a match for which a familiar label recognition event is written or published by computer vision service 118. When the target label is detected in a video frame of the analyzed video, computer vision service 118 extracts features from the video frame(s) containing the target label and generates a target label descriptor therefrom like when generating descriptors for the target label from images of the target label for the collection. The generated target descriptor is compared for distance from or similarity to descriptors in the collection. If the generated target descriptor is within a threshold distance or similarity of a descriptor in the collection, then a match is made. If the generated target descriptor matches multiple descriptors in the collection, then the closest in distance or most similar descriptor in the collection may be selected as the descriptor to which the generated target descriptor is matched.

Familiar and unfamiliar label recognition may be used to reduce unneeded notifications. For example, consumer 124 may wish to be notified only when an unfamiliar person or face is recognized in video is captured by camera 102. Alternatively, consumer 124 may wish to be notified when a familiar person or face is recognized such as when a child returns home from school or the like.

For unique label recognition, the analysis settings may specify a set of one or more target labels that are to be recognized uniquely. However, unlike with label recognition where a recognition event is written or published by computer vision service 118 when one instance (e.g., the first instance) of a target label is recognized, a recognition event is written or published by computer vision service 118 for each unique instance of a target label. Thus, with the label recognition case, if two unique instances (e.g., two different persons) of a target label (e.g., "person") exist in the analyzed video, then computer vision service 118 may write or publish a recognition event for just one of the recognized instances. In contrast, with unique label recognition, computer vision service 118 may write or publish a recognition event for each unique instance of the target label (e.g., "person").

To identify a unique instance of a target label, features may be extracted from a video frame in which a target label is recognized. The features may be used to generate a descriptor of the target label as in the familiar label recognition case. A descriptor may be generated for each instance of a target label recognized in the analyzed video. Descriptors may be compared to each for similarity or distance to determine if two instances of a target label are the same unique label.

For label recognition across non-overlapping cameras, the analysis settings may specify a set of one or more target labels to be recognized uniquely across the input video from the non-overlapping cameras. Computer vision service 118 may write or publish a recognition event when instances of a target label are recognized in both input video streams and the instances are the same unique label. For this, computer vision service 118 may employ label detection or label tracking techniques to determine if a recognition event should be written or published. For example, if a target label is "person," then if it is determined that an instance of a person label in one video stream is probabilistically the same instance of in the other video stream, then computer vision service 118 may write or publish a recognition event indicating that the unique label was recognized by the non-overlapping cameras. This may be useful, for example, to detect when a person is moving about premises 104 such as when moving from the front yard where one camera is positioned to the backyard where another camera is positioned.

With all the above types of analysis, the analysis conducted by computer vision service 118 is probabilistic. Thus, the analysis settings may specify confidence, similarity, or distance thresholds. If an analysis results in a recognition event with a confidence below a confidence threshold, a similarity greater than a similarity threshold, or a distance greater than a distance threshold, then computer vision service 118 may not write or publish the recognition event. Alternatively, computer vision service 118 may write or publish the recognition event but with an indication that a specified threshold was not satisfied by the recognition event.

In some embodiments, the analysis settings optionally specify a set of one or more bounding boxes or bounding polygons indicating a set of one or more regions of interest with respect to an input video stream. Each region of interest is a location in the video frames of the input video stream where computer vision service 118 will apply the analysis excluding locations not within a region of interest. Further, different sets of target labels may be assigned to different regions of interest in the request to create a stream processor at computer vision service 118. This may be useful to reduce unneeded notifications. For example, consider a camera positioned in the front yard of a home where the field of view encompass a fenced in area of the front yard and a driveway that connects the public sidewalk to the fenced in area. In this case, two regions of interest may be specified. One region of interest may encompass the fenced in area of the front yard and the other region may encompass the driveway. The request to create the stream processor at Operation 6 may specify two bounding boxes or bounding polygons. One covering the area of the video frames that includes the fenced in area and another covering the area of the video frames that includes the driveway. The request might also specify person as the target label to be recognized for the fenced in area and specify pet as the target label to be recognized for the driveway. By doing so, unneeded notifications where a pet is recognized in the fenced in area can be suppressed but notifications where a pet is recognized outside the fenced in area in the driveway can be received. At the same time, a notification about a person approaching the house from the sidewalk via the driveway is not made until the person enters the fenced in area. A region of interest may be specified in the analysis settings as a set of ordered cartesian (X, Y) coordinates corresponding to the vertices of a bounding polygon and selecting the location in the video frames. A default or assumed winding (e.g., clockwise or counterclockwise) for the set of ordered coordinates may be used. A region of interest specified as a bounding box may be specified as a set of ordered cartesian coordinates or, alternatively, by the box's height, width, and a cartesian coordinate for one of the four corners of the box.

At Operation 7, camera 102 sends an initialization request to customer cloud 114. The initialization request may be sent by camera 102 after power-on or periodically, for example. In response to sending the initialization request, camera 102 may receive an identifier of the input video stream at stream processor 112 to which camera 102 is to stream captured video. This may be the input video stream created at steam processor 112 at Operation 4, for example. If there are multiple cameras at premises 104, then customer cloud may receive multiple like initialization requests from each of the cameras. Each camera may be configured to stream captured video to a different input video stream at stream processor 112.

At some point in time after initialization at Operation 7, a trigger event (e.g., motion, sound, smoke, etc.) occurs. Camera 102 detects or is notified of the trigger event. In response, camera 102 begins capturing video. At Operation 8, camera 102 begins streaming the captured video to stream processor 112. Camera 102 will continue capturing and streaming video for a period of time after being notified of or detecting the trigger event. For example, camera 102 may be configured to capture and stream ten, thirty, sixty, or ninety seconds of video in response to a trigger event. In some variations, as part of Operation 8, camera 102 applies a pre-trained machine learning model to the captured video to confirm that the captured video probably contains a label of interest before beginning to stream the captured video to stream processor 112. For example, camera 102 may have pre-downloaded the pre-trained machine learning model from customer cloud 114 as part of the initialization operation of Operation 7. In this case, customer cloud 114 may have previously downloaded or obtained the pre-trained machine learning model from computer vision service 118 which trained the machine learning model to recognize a particular type of label.

As indicated by the dashed box of FIG. 2 labeled "While Streaming," Operation 8 continues for a period of time during which other operations are performed. While in some embodiments camera 102 captures and streams video in response to a trigger event but is otherwise dormant with respect to capturing and streaming video, camera 102 captures video continuously and streams the captured video to stream processor 112 only in response to a trigger event in other embodiments. For example, camera 102 may capture video continuously and stream the ten, thirty, sixty, or ninety seconds of video following a trigger event to stream processor 112. In both of these embodiments, video streaming data of captured outside the context of trigger event that is less likely to be the subject of an analysis request is not streamed to stream processor 112 and therefore does not consume network bandwidth between camera 102 and stream processor 112. However, in yet other embodiments, camera 102 both continuously captures and streams video to stream processor 112 irrespective of when trigger events occur.

At Operation 9, camera 102 notifies customer cloud 114 of the occurrence of the trigger event. In doing so, camera 102 may provide an identifier of camera 102 or an identifier of the input video stream at stream processor 112 or other information from it can be determined which input video stream at stream processor 112 is associated with the trigger event. The notification of the trigger event may also include timing information such as a producer timestamp for the video stream or a fragment identifier corresponding to when the trigger event occurs or when camera 102 started capturing video or when camera 102 started streaming captured video to stream processor 112. In some embodiments, as camera 102 streams captured video to stream processor 112, stream processor 112 returns to camera 102 the fragment identifiers assigned to received video fragments. This allows camera 102 to provide the identifier of a fragment (e.g., the first fragment) streamed to stream processor 112 following the trigger event in the notification of the trigger event sent to customer cloud 114 at Operation 9.

At Operation 10, customer cloud 114 requests computer vision service 118 to start an analysis of the input video stream being streamed from camera 102. In some variations, both the CreateStreamProcessor( ) request at Operation 6 and the StartAnalysis( ) request at Operation 10 are part of the same analysis request. Thus, an analysis request may be composed of one or more underlying requests (e.g., one or more HTTPS request). The CreateStreamProcessor( ) request at Operation 6 is made to prepare computer vision service 118 for analysis of the input video stream and the StartAnalysis( ) request at Operation 10 is made after the trigger event has occurred and to begin the analysis. The request at Operation 10 may specify an identifier of the input video stream at stream processor 112 to analyze. The request may also specify a start selector and a stop selector. The start selector specifies where in the input video stream to start the analysis and the stop selector specifies where in the input video stream to stop the analysis. The start selector may be a producer timestamp or a fragment identifier of a fragment of the input video stream at which computer vision service 118 is to start the analysis. The stop selector may be an amount of video capture time after which the analysis is to stop. For example, if each fragment is five seconds in video capture time, and the stop selector is specified as twelve seconds, then computer vision service 118 will perform the analysis over two full fragments plus two seconds of a third fragment. It should be noted that computer vision service 118 may also stop the analysis before the amount of time specified in the stop selector if there is not enough video to analyze. For example, if camera 102 streamed only ten seconds of video in response to the trigger event and the stop selector is specified as twelve seconds, then computer vision service 118 will stop the analysis after analyzing the ten seconds of video.

While in some variations the input video stream at stream processor 112 to analyze is specified as part of the request at Operation 10, the input video stream at analyze is specified as part of the request at Operation 6. In this case, the request at Operation 10 may still specify a start selector and a stop selector. In some variations, event-driven analysis of the input video stream is supported and the request at Operation 10 is not needed. In this case, computer vision service 118 may consume the input video stream from stream processor 112 whenever video data of the input video stream is available at stream processor 112 from camera 102. An event notification mechanism between stream processor 112 and computer vision service 118 may be used to notify computer vision service 118 when new video data of the input video stream arrives at stream processor 112. Computer vision service 118 may then consume the input video stream from stream processor 112 and perform computer vision analysis on the input video stream until camera 102 stops streaming video data to the input video stream. This way customer cloud 114 need only perform a one-time setup request at Operation 6 to configure computer vision service 118 how to process the input video stream at stream processor 112 (e.g., specify the analysis to be conducted on the input video stream). The one-time setup can be leveraged over multiple computer vision analysis sessions of the input video stream. For example, in response to a trigger event, camera 102 may begin streaming video data of the input video stream to stream processor 112 at Operation 8. In turn, stream processor 112 may notify computer vision service 118 that there is new video data of the input video stream available at stream processor 112. This starts a new analysis session during which computer vision service 118 consumes video data of the input video stream from stream processor 112 until camera 102 stops streaming video data of the input video stream to stream processor 112. For example, camera 102 may be configured to stream a predetermined amount of video to stream processor 112 in response to a trigger event (e.g., ten seconds of video, thirty seconds of video, etc.) When camera 102 stops streaming video data of the input video stream processor 112 then stream processor 112 may notify computer vision service 118 that there is no more video data of the input video stream currently available or computer vision service 118 may detect this based on having consumed all currently available video data of the input video stream at stream processor 112. This may mark the end of the current analysis session. A new analysis session may start and be conducted by computer vision service 118 when camera 102 again begins streaming video data of the input video stream to steam processor 112 (e.g., in response to another trigger event).

At Operation 11, computer vision service 118 consumes the input video stream from stream processor 112 starting with the fragment specified by the start selector of the request to start the analysis and continuing to consume the input video stream until the stop condition of the stop selector is satisfied or until all fragments streamed to the input video stream by camera 102 have been consumed. As discussed above, computer vision service 118 can instead consume input video stream from stream processor 112 whenever and so long as there is video data of the input video stream currently available at stream processor 112. In this case, if a request is made at Operation 10 specifying a start selector or a stop selector, then computer vision service 118 may use the start selector or the stop selector to determine which portion of the consumed input video stream to analyze.

Operations 12. WriteRecongitionEvent( ) 13. PublishRecognitionEvent( ) and 14. Cons umeRecognitionEvent( ) may be performed repeatedly while computer vision service 118 is conducted the analysis of the input video stream. At Operation 12, computer vision service 118 writes a recognition event to the output data stream at stream processor 112 as the event is recognized in the input video stream during the analysis. Customer cloud 114 consumes this event at Operation 14. Customer cloud 114 may consume the event for notification, analytic, or other purposes. Computer vision service 118 may write a recognition event at Operation 12 for each such event recognized during the analysis. What is recognized as a recognition event may vary depending on the type of analysis conducted. For example, if the analysis requested is label recognition, then computer vision service 118 may write a recognition event for an instance of each target label recognized in the analyzed video. At Operation 13, computer vision service 118 publishes the recognition event to the message channel created at notification service 120 in Operation 2.

When computer vision service 118 has finished the analysis of the input video stream, computer vision service 118 at Operation 15 publishes an end-of-session event to the message channel at notification service 120. In addition, computer vision service 118 at Operation 16 may write the end-of-session event to the output data stream at stream processor 112. Consumer cloud 114 may consume the end-of-session event from the output data stream at Operation 18. Computer vision service 118 writes the final results of the analysis to the data storage container created at Operation 1 to data storage service 122.

Figure 3:
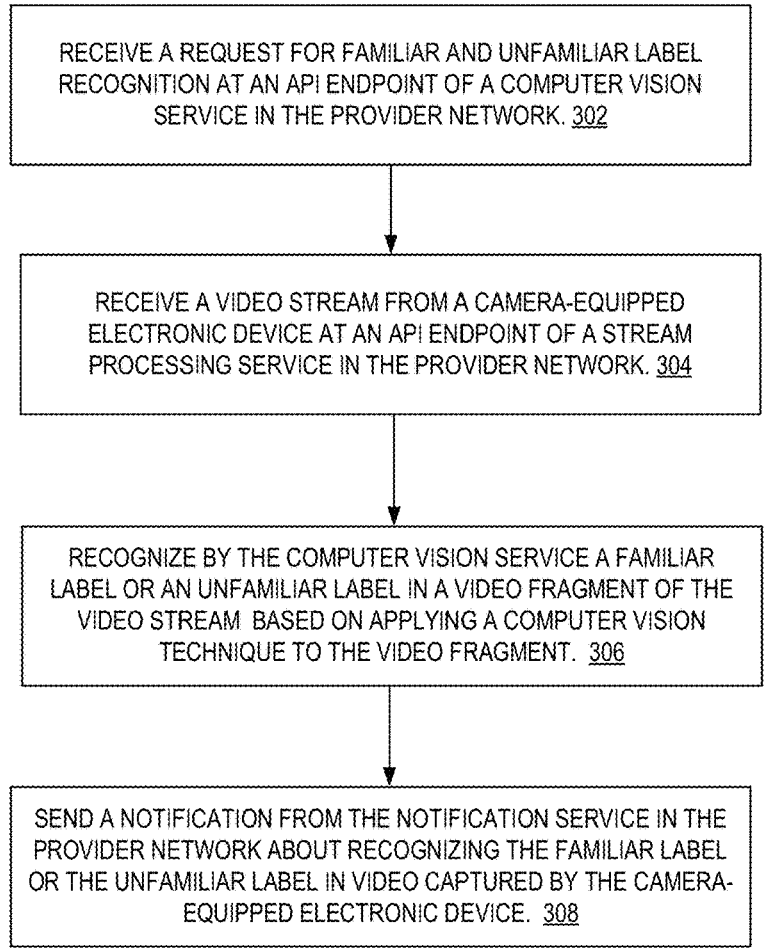
FIG. 3 is a flowchart of a process for familiar and unfamiliar label recognition and notification for streaming video according to some embodiments.

FIG. 3 is a flow diagram illustrating operations 300 of a method for familiar and unfamiliar label recognition for streaming video according to some embodiments. Some or all the operations 300 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 300 are performed by stream processor 112, computer vision service 118, and notification service 120 of the other figures.

The operations 300 include, at block 302, computer vision service 118 receiving a request for familiar and unfamiliar label recognition at API endpoint 116 of computer vision service 118. The request may be an analysis request and encompass one or more underlying network requests such as one of or both of the requests of Operation 6. CreateStreamProcessor( ) and Operation 10. StartAnalysis( ) of FIG. 2. The request may specify a target label such as, for example, "person," "pet", or "face." The request may also specify a collection of one or more label descriptors which represents a set of one or more unique labels of the target label that are considered familiar labels for the purpose of the request. For example, if the target label is "pet," then each label descriptor in the collection may represent a unique pet. Likewise, if the target label is "person," then each label descriptor in the collection may represent a unique person, and if the target label is "face," then each label description in the collection may represent a unique face. The request may also specify a confidence, similarity, or distance threshold that governs when an instance of the target label in the analyzed video is recognized as a familiar label or an unfamiliar label. The request may also specify a bounding box or a bounding polygon that restricts the location of the video frames that are analyzed. The request may also specify the start time or starting fragment number of the input video stream at which to begin the analysis. The request may further specify the stop time or otherwise indicate how much of the input video stream to analyze. Finally, the request may identify the input video stream at stream processor 112 which contains or will contain the video data to which the received 302 request applies.

The operations 300 include, at block 304, the stream processor 112 receiving the input video stream from a camera-equipped electronic device via API endpoint 110 of stream processor 112. The camera may stream the video in response to detecting or being notified of a trigger event such as detected motion, sound, smoke, etc. Stream processor 112 may receive the video stream from the camera according to a streaming protocol such as the Real-Time Transport Protocol (RTP), the Real-Time Messaging Protocol (RTMP), the HTTPS Live Streaming protocol (HLS), the Web Real-Time Communication protocol (WebRTC), or other protocol suitable for streaming captured video from the camera to stream processor 112 over one or more intermediate network(s).

The operations 300 further include, at block 306, computer vision service 118 recognizing a familiar label or an unfamiliar label in a video fragment of the video stream. This recognition may be based on computer vision service 118 applying a computer vision technique to a video frame from a video fragment of the input video stream. For example, the computer vision technique may be a label detection technique. If an instance of the target label is detected in the video frame, then computer vision service 118 may extract features from the video frame for the purpose of generating a label descriptor for the instance. The generated label descriptor may then be compared to each label descriptor in the collection specified in the request. If there is a match within a threshold (e.g., a threshold specified in the request), then computer vision service 118 may recognize the instance as a familiar label. If there is not a match within the threshold, then computer vision service 118 may recognize the instance as an unfamiliar label. For example, there might be two instances of a person in different video frames of the analyzed video, one of the instances might be identified as a familiar person and the other instance might be identified as an unfamiliar person. For example, the familiar label might be a family member instance while the unfamiliar label might be a stranger to the family.

The operations 300 further include, at block 308, notification service 120 sending a notification, published by computer vision service 118 to a message channel at notification service 120, about recognizing a familiar label or an unfamiliar label in the video captured by the camera. Notification service 120 may send the published recognition event to a set of one or more subscribers to the message channel. The subscriber can be a process or an application in customer cloud 114, for example, or other process or application in provider network 100.

In some embodiments, the notification identifies the input video stream at stream processor 112 that is analyzed. The notification also identifies a familiar label or an unfamiliar label recognized in the input video stream analyzed. For a familiar or unfamiliar label recognized, the notification may identify the class or type of label (e.g., "person," "pet," or "face"). For a familiar label, the notification may also include the label descriptor that uniquely identifies the familiar label recognized. It should be noted that the label descriptor itself may be a sequence of seemingly random alpha-numeric characters that by itself does convey a personal or individual identity of the label represented. For example, a label descriptor for a person recognized in the analyzed video represents that the recognized person is probably the person represented by the label descriptor but the label descriptor by itself does not inform who that person is.

Other information in the notification may include a confidence score, percentage value, or probability value that reflects how probable a recognized familiar label is the unique label represented by the label descriptor to which the recognized familiar label is matched. The notification may include or refer to (e.g., via a Uniform Resource Indicator (URI)) a cropped image. The cropped image may be of a familiar or unfamiliar label that is cropped from a video frame in which the familiar or unfamiliar label is recognized. The notification may include or refer to (e.g., via a URI) the video frame in which a familiar or unfamiliar label is recognized. The notification may include or refer to (e.g., via a URI) a video fragment in which a familiar or unfamiliar label is recognized. The notification may include information about a video fragment in which a familiar or unfamiliar label is recognized such as a video fragment identifier, the fragment's producer timestamp, the fragment's server timestamp, and a time offset (e.g., in milliseconds or seconds) from the beginning of the video fragment in which a familiar or unfamiliar label first appears. The notification may also include a bounding box or a bounding polygon that specifies a region of a video frame in which a familiar of unfamiliar label is located.

In some embodiments, computer vision service 118 publishes a "recognition event" notification to a message channel at notification service 120 for each familiar label and for each unfamiliar label recognized in the input video stream analyzed. In some cases, a recognition event notification is published for only one instance (e.g., the first instance) of each unique familiar and unfamiliar label that appears in the input video stream. For example, if a familiar person appears 2 seconds into the input video stream, an unfamiliar person appears 4 seconds into the input video stream, and the familiar person appears again at 7 seconds into the input video stream, then computer vision service 118 publishes a recognition event notification for the familiar person recognized at second 2 and a recognition event notification for the unfamiliar person recognized at second 4 but not for the re-recognition of the familiar person at second 7. However, if a new familiar person appeared at 7 seconds into the input video stream instead of the same familiar person re-appearing, then computer vision service 118 may publish a third recognition event for the familiar person recognized at 7 seconds.

Computer vision service 118 may also publish an "end-of-session event" notification to a message channel at notification service 120 when computer vision service 118 has completed its analysis of an input video stream in the context of a video analysis session. The end-of-session session event notification may include a session identifier identifying the analysis session completed. The same session identifier may be included in the preceding recognition event(s) published for the same analysis session. By doing so, a subscriber to the message channel can correlate received recognition event(s) to the session for which they were published.

If the message channel is a standard message channel, then an end-of-session event notification may be sent to a subscriber before all recognition event notifications published for the same session have been sent to the subscriber. This is because a standard message channel does not provide strict ordering when sending published messages. In this case, a subscriber may continue to consume recognition event notification(s) for a session from the message channel for a period of time after the end-of-session event notification for the session is received in case notification(s) for the session are not sent from the message channel in the same order they were published to the message channel.

In addition to an identifier of a session, the end-of-session event notification may include any and all information from each of the recognition event notification(s) published for the session. Further, the end-of-session event notification may include or refer to one or more video fragments analyzed. For example, the end-of-session event notification may include one or more URIs to one or more analyzed video fragments stored in a data storage service (e.g., data storage service 122) stored there by computer vision service 118. Video frames of an analyzed video fragment included in or referred to by the end-of-session event notification can be annotated with bounding boxes or bounding polygons encompassing a familiar and unfamiliar label recognized. Video frames of a video fragment containing a recognized familiar and unfamiliar label may also be annotated to indicate whether the corresponding label is familiar or unfamiliar. For example, a bounding box encompassing a familiar person might be annotated in a video frame with the text "familiar person," "familiar person-1," "known person," "known person-1," "family member," or "family member-1," or the like, where "family member" is derived from the name of or metadata associated with the label descriptor collection to which the label was matched. Likewise, a bounding box or polygon encompassing an unfamiliar person might be annotated or associated with the text "unknown person," "unknown person-1," "unfamiliar person," "unfamiliar person-1", "not a family member," or the like.

In some embodiments, the end-of-session event notification includes or refers to (e.g., by a URI) a hero image. A hero image is a representative video frame from the analyzed video. For example, a hero image can be selected by computer vision service 118 for each recognition event notification. The hero image selected can be a representative video frame containing the familiar or unfamiliar label that is subject of the recognition event. Like a video frame of a video fragment, a hero image may be annotated with a bounding box or bounding polygon or text.

When a subscriber receives a recognition event notification or an end-of-session event notification from a message channel at notification service 120, the subscriber may send an electronic notification to a consumer (e.g., consumer 124). The electronic notification notifies the consumer about one or more recognition events. The electronic notification can be by any one of a variety of electronic messaging means such as, for example, electronic mail (e-mail), text message (e.g., SMS message), mobile push notification, etc. The notification the consumer receives can include or refer to any and all of the information of the recognition event notification(s) and the end-of-session event notification published to the message channel for the session to which the consumer notification pertains.

In some contexts, operations 300 are performed in a home or enterprise security context to determine if labels appearing in a home or enterprise security camera are familiar or unfamiliar. For example, operation 300 may be performed for just-in-time recognition and notification that an unfamiliar person has entered the back yard of a home or is approaching the front door of the home. In this case, for example, soon (e.g., within seconds or minutes) after the unfamiliar person has triggered a motion sensor, consumer 124 may receive a notification at personal electronic device 126 from customer cloud 114 when an unfamiliar person is recognized on video captured by camera 102 but not when a familiar is person is recognized, as determined by personal preferences of consumer 124 configured with customer cloud 114.

In another context, operations 300 are performed in a registration context to determine if a person physically appearing at a physical location to obtain a good or service for which a person previously registered (e.g., a person appearing at a test taking location to take a test) is the same person that previously registered to obtain the good or service (e.g., by providing photo identification). In this context, a familiar person may be one that previously registered and an unfamiliar person is may be one that is not registered.

In yet another context, operations 300 are performed to recognize famous persons (e.g., celebrities or public figures) in a video stream. In this case, the video stream received at operation 304 may be received from an electronic device that is not camera equipped. For example, the electronic device can be a mobile phone, a tablet computer, a laptop computer, or a personal computing device. In this context, a familiar label may be one a celebrity or public figure of interest.

In yet another context, operations 300 are performed to recognize certain trademarked logos that may appear in a video stream. Again, in this case, the video stream may be received 304 from an electronic device that is not camera equipped. In this context, a familiar label may be a trademarked logo of interest.

Figure 4:
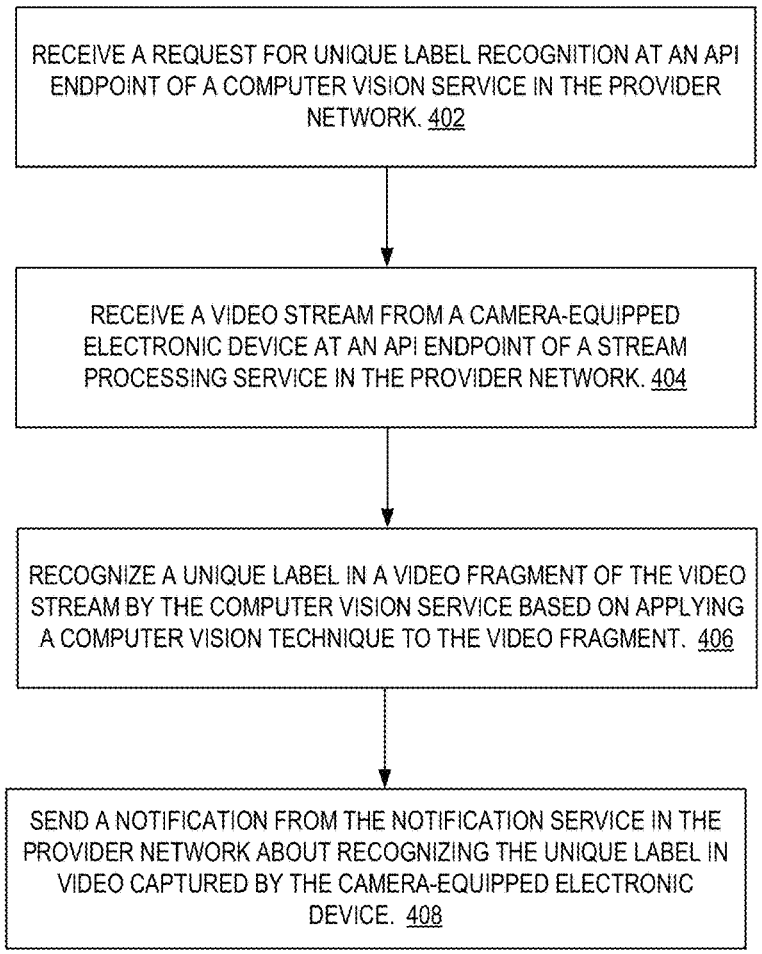
FIG. 4 is a flowchart of a process for unique label recognition and notification for stream video according to some embodiments.

FIG. 4 is a flow diagram illustrating operations 400 of a method for unique label recognition for streaming video according to some embodiments. Some or all the operations 400 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 400 are performed by stream processor 112, computer vision service 118, and notification service 120 of the other figures.

The operations 400 further, at block 402, computer vision service 118 receiving a request for unique label recognition at API endpoint 116 of computer vision service 118. The request may be an analysis request and encompass one or more underlying network requests such as one of or both of the requests of Operation 6. CreateStreamProcessor( ) and Operation 10. StartAnalysis( ) of FIG. 2. The request may specify a target label such as, for example, "person," "pet", or "face." The request may also specify a confidence, similarity, or distance threshold that governs when two instances of the target label in the analyzed video are recognized as the same unique label. The request may also specify a bounding box or a bounding polygon that restricts the location of the video frames that are analyzed. The request may also specify the start time or starting fragment number of the input video stream at which to begin the analysis. The request may further specify the stop time or otherwise indicate how much of the input video stream to analyze. Finally, the request may identify the input video stream at stream processor 112 which contains or will contain the video data to which the received 402 request applies.

The operations 400 include, at block 404, the stream processor 112 receiving a video stream from a camera-equipped electronic device at API endpoint 110 of stream processor 112. The camera may stream the video in response to detecting or being notified of a trigger event such as detected motion, sound, smoke, etc. Stream processor 112 may receive the video stream from the camera according to a streaming protocol such as the Real-Time Transport Protocol (RTP), the Real-Time Messaging Protocol (RTMP), the HTTPS Live Streaming protocol (HLS), the Web Real-Time Communication protocol (WebRTC), or other protocol suitable for streaming captured video from the camera to stream processor 112 over one or more intermediate network(s).

The operations 400 further include, at block 406, computer vision service 118 recognizing a unique label in a video fragment of the video stream. This recognition may be based on computer vision service 118 applying a computer vision technique to a video frame from a video fragment of the input video stream. For example, the computer vision technique may be a label detection technique. If a first instance of the target label is detected in a first video frame, then computer vision service 118 may extract features from the first video frame in which the first instance is detected for the purpose of generating a label descriptor for the first instance. The first instance is recognized as a unique label. If a second instance of the target label is detected in a second video frame, then computer vision service 118 may determine if the first instance and the second instance are probably the same label. To do so, computer vision service 118 may extract features from the second video frame in which the second instance is detected for the purpose of generating a label descriptor for the second instance. The label descriptors are compared for similarity or distance and if sufficiently similar or close in distance (e.g., within a threshold), then computer vision service 118 recognizes the two instances are the same unique label. Otherwise, the two instance are recognized as two distinct unique labels. It should be noted that this comparison between label descriptors is not needed for two instances of the target label that appear in the same video frame. In that case, the two instances are probably distinct unique labels. For example, a person that walks through the field of view of a camera may be recognized as a first unique label. If that person later in the video again walks through the field of view of the camera, then the person may be recognized again as the first unique label. However, if a different person walks through the field of view of the camera, then this person may be recognized as a second unique label.

While in some variations unique labels are recognized within a single video analysis session, unique labels are recognized across multiple video analysis sessions in other variations. For example, unique labels may be recognized across all video analysis sessions for the input video stream. For example, if a particular instance of a target label is recognized in a first video analysis session for the input video stream and the particular instance of the target label is recognized again in a second video analysis session for the input video stream, the particular instance recognized in the second video analysis session may be considered to be the same unique label as the particular instance recognized in the first video analysis session. This mode of operation may be useful to avoid confusing or unnecessary notifications. For example, it may be desirable that a person that periodically moves in and out of a camera's field of view each time triggering a new video analysis session through motion detection be recognized as the same unique person across the video analysis sessions triggered as opposed to being recognized as a different unique person for each of the video analysis sessions.

The operations 400 further include, at block 408, notification service 120 sending a notification, published by computer vision service 118 to a message channel at notification service 120, about recognizing a unique label in the video captured by the camera. Notification service 120 may send the published recognition event to a set of one or more subscribers to the message channel. The subscriber can be a process or an application in customer cloud 114, for example, or other process or application in provider network 100. In some embodiments, the notification identifies the input video stream at stream processor 112 that is analyzed. The notification also identifies a unique label recognized in the input video stream analyzed. For a unique label recognized, the notification may identify the class or type of label (e.g., "person," "pet," or "face").

The notification may include or refer to (e.g., via a Uniform Resource Indicator (URI)) a cropped image. The cropped image may be of a unique label that is cropped from a video frame in which the unique label is recognized. The notification may include or refer to (e.g., via a URI) the video frame in which a unique label is recognized. The notification may include or refer to (e.g., via a URI) a video fragment in which a unique label is recognized. The notification may include information about a video fragment in which a unique label is recognized such as a video fragment identifier, the fragment's producer timestamp, the fragment's server timestamp, and a time offset (e.g., in milliseconds or seconds) from the beginning of the video fragment in which a unique label first appears. The notification may also include a bounding box or a bounding polygon that specifies a region of a video frame in which a unique label is located.

In some embodiments, computer vision service 118 publishes a "recognition event" notification to a message channel at notification service 120 for each unique label recognized in the input video stream analyzed. In some cases, a recognition event notification is published for only one instance (e.g., the first instance) of each unique label that appears in the input video stream. For example, if a first person appears 2 seconds into the input video stream, a second person appears 4 seconds into the input video stream, and the first person appears again at 7 seconds into the input video stream, then computer vision service 118 publishes a recognition event notification for the first person recognized at second 2 and a recognition event notification for the second person recognized at second 4 but not for the re-recognition of the first person at second 7. However, if a third person appeared at 7 seconds into the input video stream instead of the first person re-appearing, then computer vision service 118 may publish a third recognition event for the third person recognized at 7 seconds.

Computer vision service 118 may also publish an "end-of-session event" notification to a message channel at notification service 120 when computer vision service 118 has completed its analysis of an input video stream in the context of a video analysis session. The end-of-session session event notification may include a session identifier identifying the analysis session completed. The same session identifier may be included in the preceding recognition event(s) published for the same analysis session. By doing so, a subscriber to the message channel can correlate received recognition event(s) to the session for which they were published.

In addition to an identifier of a session, the end-of-session event notification may include any and all information from each of the recognition event notification(s) published for the session. Further, the end-of-session event notification may include or refer to one or more video fragments analyzed. For example, the end-of-session event notification may include one or more URIs to one or more analyzed video fragments stored in a data storage service (e.g., data storage service 122). Video frames of an analyzed video fragment included in or referred to by the end-of-session event notification can be annotated with bounding boxes or bounding polygons encompassing a unique label recognized. Video frames of a video fragment containing a recognized unique label may also be annotated to indicate the corresponding label. For example, a bounding box encompassing a unique person might be annotated in a video frame with the text "person," "person-1," "person," "person-1," or the like. In some embodiments, the end-of-session event notification includes or refers to (e.g., by a URI) a hero image. A hero image is a representative video frame from the analyzed video. For example, a hero image can be selected by computer vision service 118 for each recognition event notification. The hero image selected can be a representative video frame containing a unique label that is subject of the recognition event. Like a video frame of a video fragment, a hero image may be annotated with a bounding box or bounding polygon or a text.

In some contexts, operations 400 are performed in a home or enterprise security context to recognize unique instance of a target label across one or more video analysis sessions. For example, operation 400 may be performed to recognize and be notified about all unique persons that approach the front door of a home or office throughout the day. Operations 400 may be performed in other contexts to recognize unique instances of other target labels either in camera-captured streamed video or in other streamed video.

Figure 5:
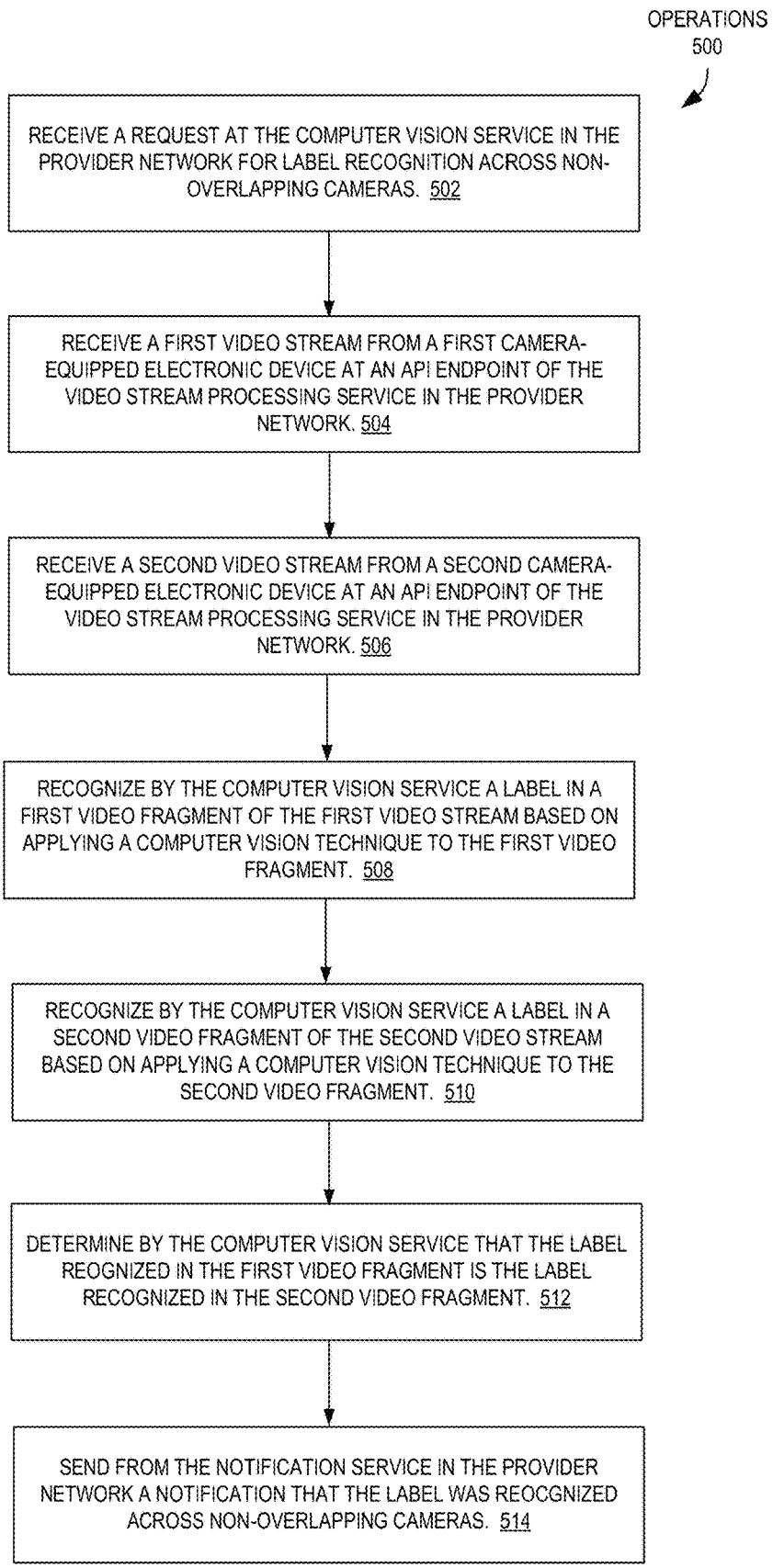
FIG. 5 is a flowchart of a process for label recognition and notification across non-overlapping cameras according to some embodiments.

FIG. 5 is a flow diagram illustrating operations 400 of a method for label recognition across non-overlapping cameras for streaming video according to some embodiments. Some or all the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by stream processor 112, computer vision service 118, and notification service 120 of the other figures.

The operations 500 include, at block 502, computer vision service 118 receiving a request for label recognition across non-overlapping cameras at API endpoint 116 of computer vision service 118. The request may be an analysis request and encompass one or more underlying network requests such as one or both of the requests of Operation 6. CreateStreamProcessor( ) and Operation 10. StartAnalysis( ) of FIG. 2. The request may specify a target label such as, for example, "person," "pet", or "face." The request may specify two input video streams, one for each of the first camera and the second camera. For each of the input video streams, the request may specify a bounding box or a bounding polygon that restricts the location of the video frames in the input video stream that are analyzed. For each of the input video streams, the request may also specify the start time or starting fragment number of the input video stream at which to begin the analysis. For each of the input video streams, the request may further specify the stop time or otherwise indicate how much of the input video stream to analyze. For example, if a person enters the front yard of a home and then walks along the side of the house to the back yard of the home, then a front yard camera may detect motion before the back yard camera detects motion. As a result, the input video streams analyzed may not overlap in time or may only partially overlap in time.

The operations 500 include, at block 504, the stream processor 112 receiving a first video stream from a first camera-equipped electronic device at API endpoint 110 of stream processor 112. The first camera may stream the video in response to detecting or being notified of a first trigger event such as detected motion, sound, smoke, etc. Stream processor 112 may receive the first video stream from the first camera according to a streaming protocol such as the Real-Time Transport Protocol (RTP), the Real-Time Messaging Protocol (RTMP), the HTTPS Live Streaming protocol (HLS), the Web Real-Time Communication protocol (WebRTC), or other protocol suitable for streaming captured video from the camera to stream processor 112 over one or more intermediate network(s).

The operations 500 include, at block 504, the stream processor 112 receiving a second video stream from a second camera-equipped electronic device at API endpoint 110 of stream processor 112. The second camera may have a field of view that does not overlap the field of view of the first camera. For example, the first camera may be in the front yard of a home and the second camera in the back yard of the home. The second camera may stream the video in response to detecting or being notified of a second trigger event such as detected motion, sound, smoke, etc. For example, the second trigger event may be motion detected by the second camera in the back yard of a home and the first trigger event may be motion detected by first camera in the front yard of the home. Stream processor 112 may receive the second video stream from the second camera according to a streaming protocol such as the Real-Time Transport Protocol (RTP), the Real-Time Messaging Protocol (RTMP), the HTTPS Live Streaming protocol (HLS), the Web Real-Time Communication protocol (WebRTC), or other protocol suitable for streaming captured video from the camera to stream processor 112 over one or more intermediate network(s).

In some embodiments, the request specifies an order in which a target label must be recognized across the two input video streams to be considered a recognition event. By specifying a required order, unneeded notifications may be suppressed. For example, the request may specify the order to be the input video stream from the front yard camera first followed by the input video stream from the back yard camera second. By doing so, a consumer may receive a notification if a person enters back yard from the front yard but not the other way around. This may be desired, for example, if the most practical way to enter the back yard is through the front yard and persons living in the home are often entering the front yard from the back yard.

The operations 500 further include, at block 508, computer vision service 118 recognizing a label in a first video fragment of the first video stream. This recognition may be based on computer vision service 118 applying a computer vision technique to a set of one or more video frames from the first video fragment of the first input video stream. For example, the computer vision technique may be a label tracking technique.

The operations 500 further include, at block 510, computer vision service 118 recognizing a label in a second video fragment of the second video stream. This recognition may be based on computer vision service 118 applying a computer vision technique to a set of one or more video frames from a second video fragment of the second input video stream. For example, the computer vision technique may be the label tracking technique applied to the set of one or more video frames of the first video fragment.

The operations 500 further include, at block 512, computer vision service 118 determining that the label recognized in the first video fragment is the label recognized in the second video fragment. For example, computer vision service 118 may extract video frame features for the label recognized in the first video fragment and video frame features for the label recognized in the second video fragment, generate label descriptors for the labels from the extracted video frame features, and compare the label descriptors for similarity or distance to determine if the labels are the same. If the result of the comparison is that the label descriptors are within a threshold similarity or distance, then labels may be determined to be the same label by computer vision service 118. If, on the other hand, the result of the comparison is that the label descriptors are not within a threshold similarity or distance, then labels may be determined to be different labels by computer vision service 118. Alternatively, the label tracking may encompass a technique for determining that the labels across non-overlapping cameras are the same such as, for example, one of the label tracking techniques discussed above.

The operations 500 further include, at block 514, notification service 120 sending a notification about recognizing the label across non-overlapping cameras. If computer vision service 118 recognizes the same unique label across video streams of non-overlapping cameras, then computer vision service 118 may publish a recognition event to a message channel at notification service 120. Notification service 120 may send the published recognition event to a set of one or more subscribers to the message channel. The subscriber can be a process or an application in customer cloud 114, for example, or other process or application in provider network 100. In some embodiments, the notification identifies the input video streams at stream processor 112 that are analyzed. The notification also identifies a unique label recognized in the input video streams analyzed. For a unique label recognized across non-overlapping cameras, the notification may identify the class or type of label (e.g., "person," "pet," or "face").

The notification may include or refer to (e.g., via Uniform Resource Indicators (URIs)) cropped images. One of the cropped images may be of the unique label that is cropped from a video frame from one of the two input video streams from one of the two non-overlapping cameras in which the unique label is recognized. Another of the cropped images may be of the unique label that is cropped from a video frame from the other of the two input video streams from the other of the two non-overlapping cameras in which the unique label is recognized.

The notification may include or refer to (e.g., via URIs) video frames in which the unique label is recognized. One of the video frames may be from one of the two input video streams from one of the two non-overlapping cameras in which the unique label is recognized. Another of the video frames may be from the other of the two input video streams from the other of the two non-overlapping cameras in which the unique label is recognized. For example, for each of the video frames the notification may also include a bounding box or a bounding polygon that specifies a region of the video frame in which the unique label is located.

The notification may include or refer to (e.g., via URIs) video fragments in which the unique label is recognized. One of the video fragments may be from one of the two input video streams from one of the two non-overlapping cameras in which the unique label is recognized. Another of the video fragments ay be from the other of the two input video streams from the other of the two non-overlapping cameras in which the unique label is recognized. For each video fragment, the notification may include an identifier of the video fragment, the fragment's producer timestamp, the fragment's server timestamp, and a time offset (e.g., in milliseconds or seconds) from the beginning of the video fragment in which the unique label first appears. For each of the video fragments, the video fragment may be annotated with a bounding box or a bounding polygon that tracks the movement of the unique label across video frames of the video fragment. The bounding box or the bounding polygon may be annotated with text identifying the unique label.

In some embodiments, a "recognition event" is published by computer vision service 118 to a message channel at notification service 120 for each unique label recognized across non-overlapping cameras in the two input video streams analyzed. In some cases, a recognition event notification is published for only one instance (e.g., the first instance) of a unique label that is recognized across non-overlapping cameras. For example, if a person walks from the front yard to the back yard, then returns to the front yard and then again walks to the back yard, only one recognition event might be published for the first occurrence of the person walking from the front yard to the back yard and a second recognition event might not be published for the second occurrence of the person returning to the back yard from the front yard.

Computer vision service 118 may also publish an "end-of-session event" notification to the message channel at notification service 120 when computer vision service 118 has completed its analysis of the input video streams in the context of a video analysis session. The end-of-session session event notification may include a session identifier identifying the analysis session completed. The same session identifier may be included in the preceding recognition event(s) published for the same analysis session. By doing so, a subscriber to the message channel can correlate received recognition event(s) to the session for which they were published.

In addition to an identifier of a session, the end-of-session event notification may include any and all information from each of the recognition event notification(s) published for the session. Further, the end-of-session event notification may include or refer to video fragments analyzed. For example, the end-of-session event notification may include URIs to analyzed video fragments stored in a data storage service (e.g., data storage service 122). Video frames of an analyzed video fragment included in or referred to by the end-of-session event notification can be annotated with bounding boxes or bounding polygons encompassing a unique label recognized. Video frames of a video fragment containing a recognized unique label may also be annotated to indicate the corresponding label. For example, a bounding box encompassing a unique person might be annotated in a video frame with the text "person," "person-1," "person," "person-1," or the like. In some embodiments, the end-of-session event notification includes or refers to (e.g., by URIs) hero images. A hero image is a representative video frame from the analyzed video. For example, hero images can be selected by computer vision service 118 for each recognition event notification, one from each of the two input video streams analyzed. The hero image selected can be a representative video frame containing a unique label that is subject of the recognition event. Like a video frame of a video fragment, a hero image may be annotated with a bounding box or bounding polygon or a text.

In some embodiments, computer vision service 118 receives feedback from a consumer (e.g., consumer 124) on a recognition task performed by computer vision service 118. Computer vision service 118 can use the feedback to adjust machine learning models accordingly. The feedback pertains to whether the computer vision service 118 accurately recognized a label as judged by the consumer. If the feedback is that the computer vision service 118 did not accurately recognized a label, then a video frame or image on which the recognition was based may be flagged as a negative training example to bias a machine learning model during a next training session of the model such that the trained model is less likely to recognize the same label in the same way.

Figure 6:
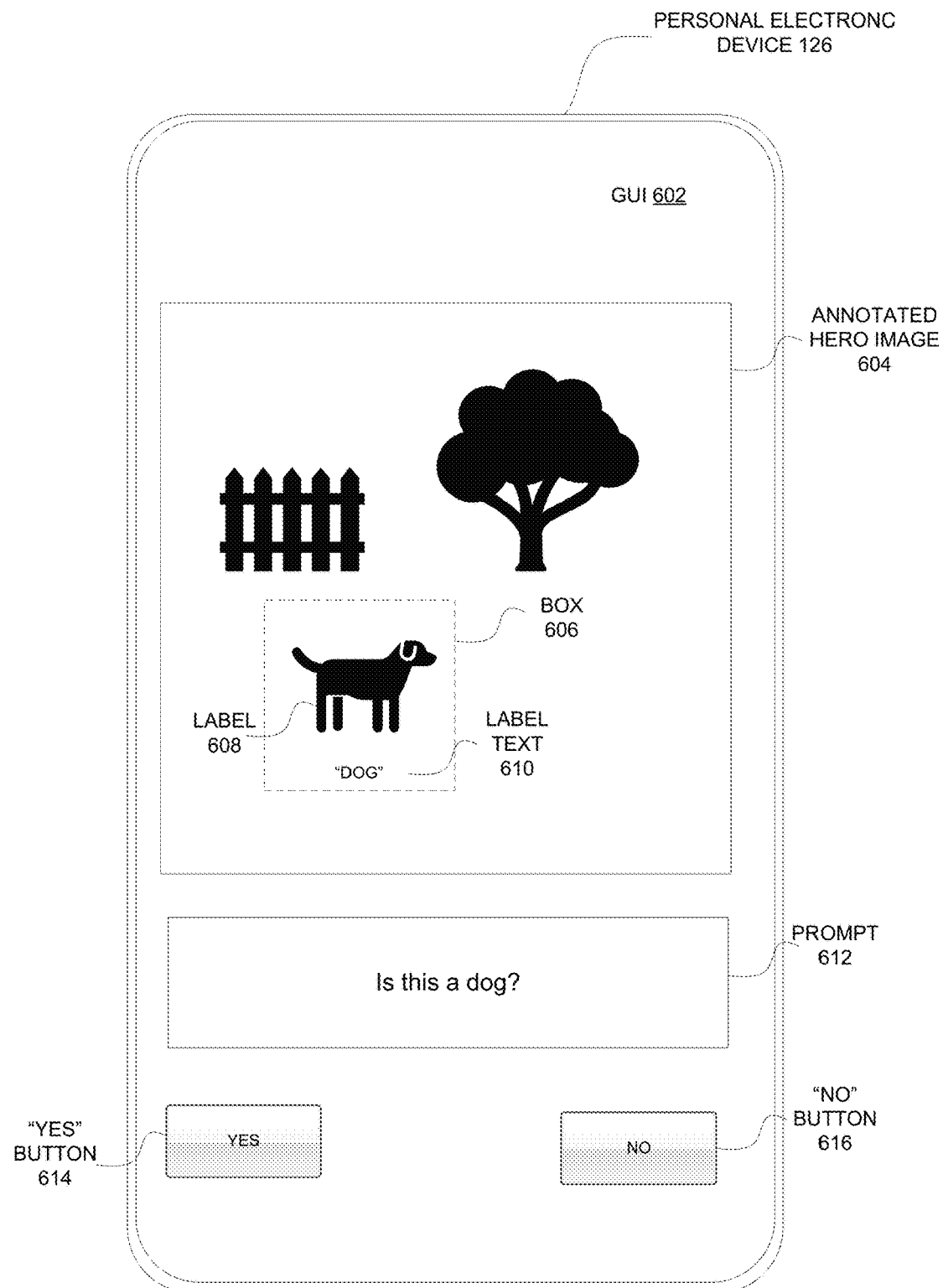
FIG. 6 depicts a consumer's personal electronic device at which a graphical user interface is presented for receiving feedback designating a label as incorrectly recognized, according to some embodiments.

In some embodiments, feedback is used to identify an incorrectly recognized label. FIG. 6 depicts consumer 124's personal electronic device 126 that encompasses graphical user interface (GUI) 602 that presents results of an analysis conducted on video captured by camera 102 by computer vision service 118, according to some embodiments. GUI 602 presents annotated hero image 604 derived from the analyzed video. Annotated hero image 604 is annotated with bounding box 606 around recognized label 608 and label text 610. Label text 610 indicates the class of label recognized, in this case "DOG." GUI 602 also includes text prompt 612. Text prompt 612 asks consumer 124 if recognized label 608 is, in fact, a "DOG." GUI 602 also offers two GUI buttons: "YES" button 614 and "NO" button 616. If consumer 124 agrees that recognized label 608 is a "DOG," then consumer 124 may select "YES" button 614. If consumer 124 disagrees, then consumer 124 may select "NO" button 616. If "NO" button is selected, then a message may be sent from device 126 via intermediate network(s) 106 to API endpoint 116 of computer vision service 116. In some embodiments, the message or a corresponding message is sent to API endpoint 116 via customer cloud 114. Upon receiving the message, computer vision service 118 may identify designate a video frame or image corresponding to annotated hero image 604 (e.g., the video frame or image that was annotated to create annotated hero image 604) as a negative example to bias a machine learning model during a next training session of the model such that the trained model is less likely to recognize the same label in the same way.

Figure 7:
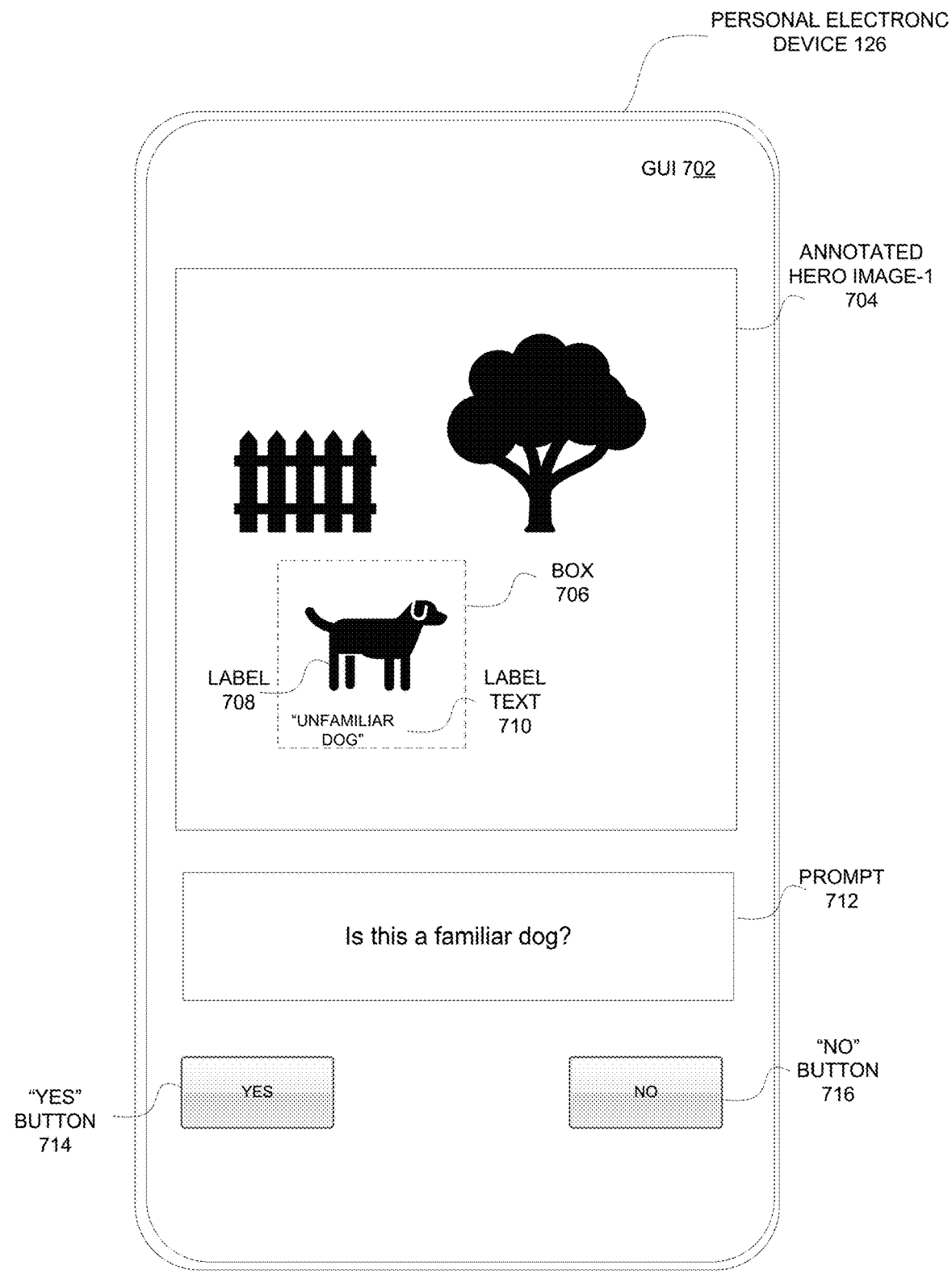
FIG. 7 depicts a consumer's personal electronic device at which a graphical user interface is presented for receiving feedback designating a label incorrectly recognized as unfamiliar as familiar, according to some embodiments.

In some embodiments, feedback is used to designate a label recognized as an unfamiliar label as a familiar label. FIG. 7 depicts consumer 124's personal electronic device 126 that encompasses graphical user interface (GUI) 702 that presents results of an analysis conducted on video captured by camera 102 by computer vision service 118, according to some embodiments. GUI 702 presents annotated hero image 704 derived from the analyzed video. Annotated hero image 704 is annotated with bounding box 706 around recognized unfamiliar label 708 and label text 710. Label text 710 indicates the class of label recognized including that the label is recognized as an unfamiliar label, in this case "UNFAMILIAR DOG." GUI 702 also includes text prompt 712. Text prompt 712 asks consumer 124 if recognized unfamiliar label 708 is, in fact, a familiar dog. GUI 702 also offers two GUI buttons: "YES" button 714 and "NO" button 716. If label 708 is a familiar dog to consumer 124, then consumer 124 may select "YES" button 714. If consumer 124 agrees that the recognized label 708 is an unfamiliar dog, then consumer 124 may select "NO" button 716. If "YES" button is selected, then a message may be sent from device 126 via intermediate network(s) 106 to API endpoint 116 of computer vision service 116. In some embodiments, the message or a corresponding message is sent to API endpoint 116 via customer cloud 114. Upon receiving the message, computer vision service 118 may generate a label descriptor based on a video frame or image corresponding to annotated hero image 704 (e.g., the video frame or image that was annotated to create annotated hero image 704). The label descriptor may then be added to the collection of label descriptors that was used to determine whether label 708 is a familiar label an unfamiliar label. This way, label 708 is more likely to be recognized as a familiar label in future analyses by computer vision service 118.

Figure 8:
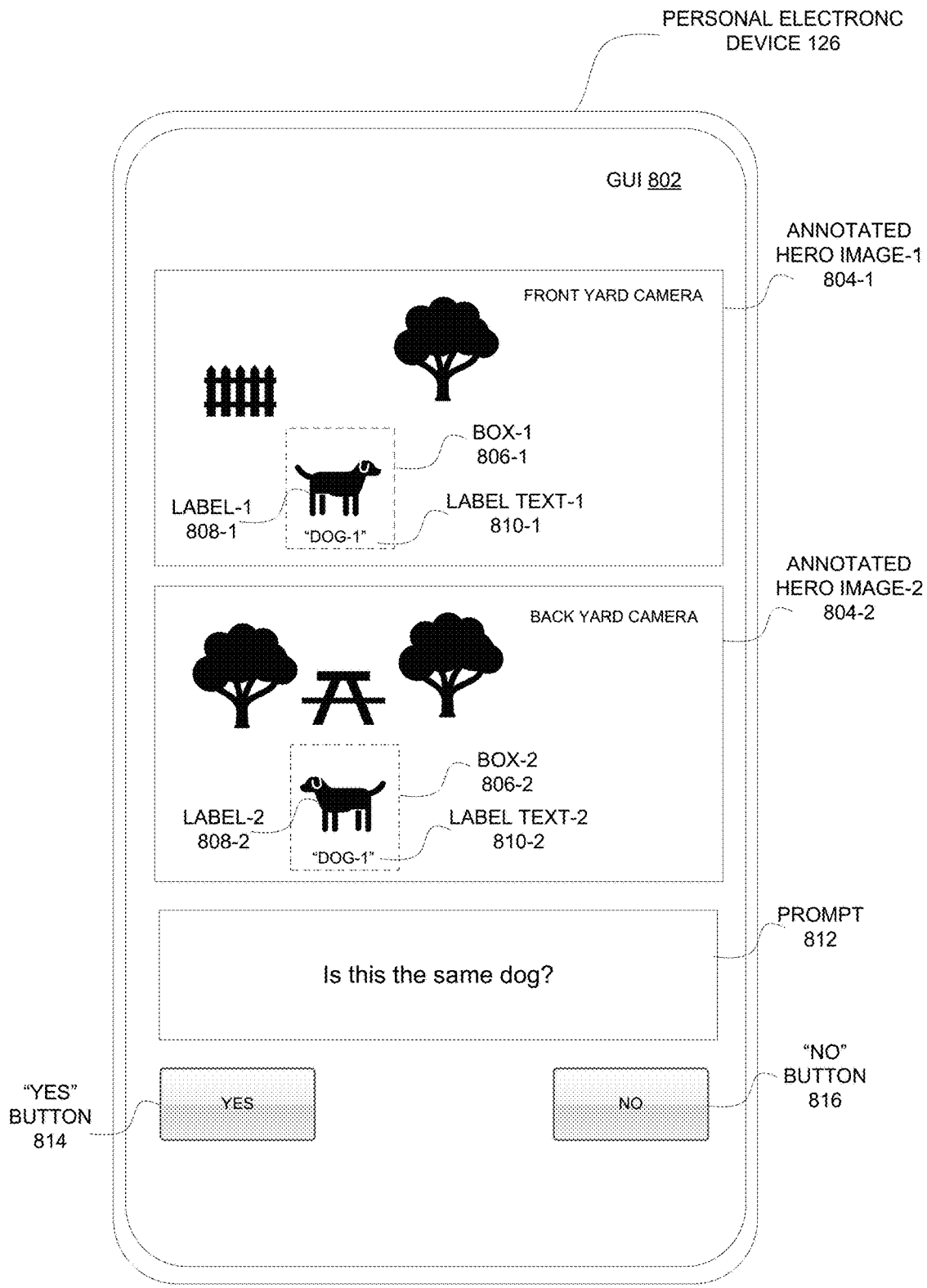
FIG. 8 depicts a consumer's personal electronic device at which a graphical user interface is presented for receiving feedback designating a label incorrectly recognized across non-overlapping cameras as the same label as not the same label, according to some embodiments.

In some embodiments, feedback is used to identify a label that was incorrectly recognized as the same label across non-overlapping cameras. FIG. 8 depicts consumer 124's personal electronic device 126 that encompasses graphical user interface (GUI) 802 that presents results of an analysis conducted on video captured by camera 102 by computer vision service 118, according to some embodiments. GUI 802 presents annotated hero image 804-1 and annotated hero image 804-2 derived from two analyzed video streams from two non-overlapping cameras (e.g., cameras where their respective fields of view do not overlap at the time of video capture). Annotated hero image 804-1 is annotated with bounding box 806-1 around recognized label 808-1 and label text 810-1. Annotated hero image 804-2 is annotated with bounding box 806-2 around recognized label 808-2 and label text 810-2. Label text 810-1 and label text 810-2 indicate that label 808-1 and label 802-2 are the same label (e.g., the same dog). GUI 802 also includes text prompt 812. Text prompt 812 asks consumer 124 if recognized labels 808-1 and 808-2 are, in fact, the same label. GUI 802 also offers two GUI buttons: "YES" button 814 and "NO" button 816. If consumer 124 agrees that recognized labels 808-1 and 808-2 are the same dog, then consumer 124 may select "YES" button 814. If consumer 124 disagrees, then consumer 124 may select "NO" button 816. If "NO" button is selected, then a message may be sent from device 126 via intermediate network(s) 106 to API endpoint 116 of computer vision service 116. In some embodiments, the message or a corresponding message is sent to API endpoint 116 via customer cloud 114. Upon receiving the message, computer vision service 118 may identify designate video frames or images corresponding to annotated hero images 804-1 and 804-2 (e.g., the video frame or image that was annotated to create annotated hero image 604) as a negative example to bias a machine learning model during a next training session of the model such that the trained model is less likely to recognize the labels as the same label.

Figure 9:
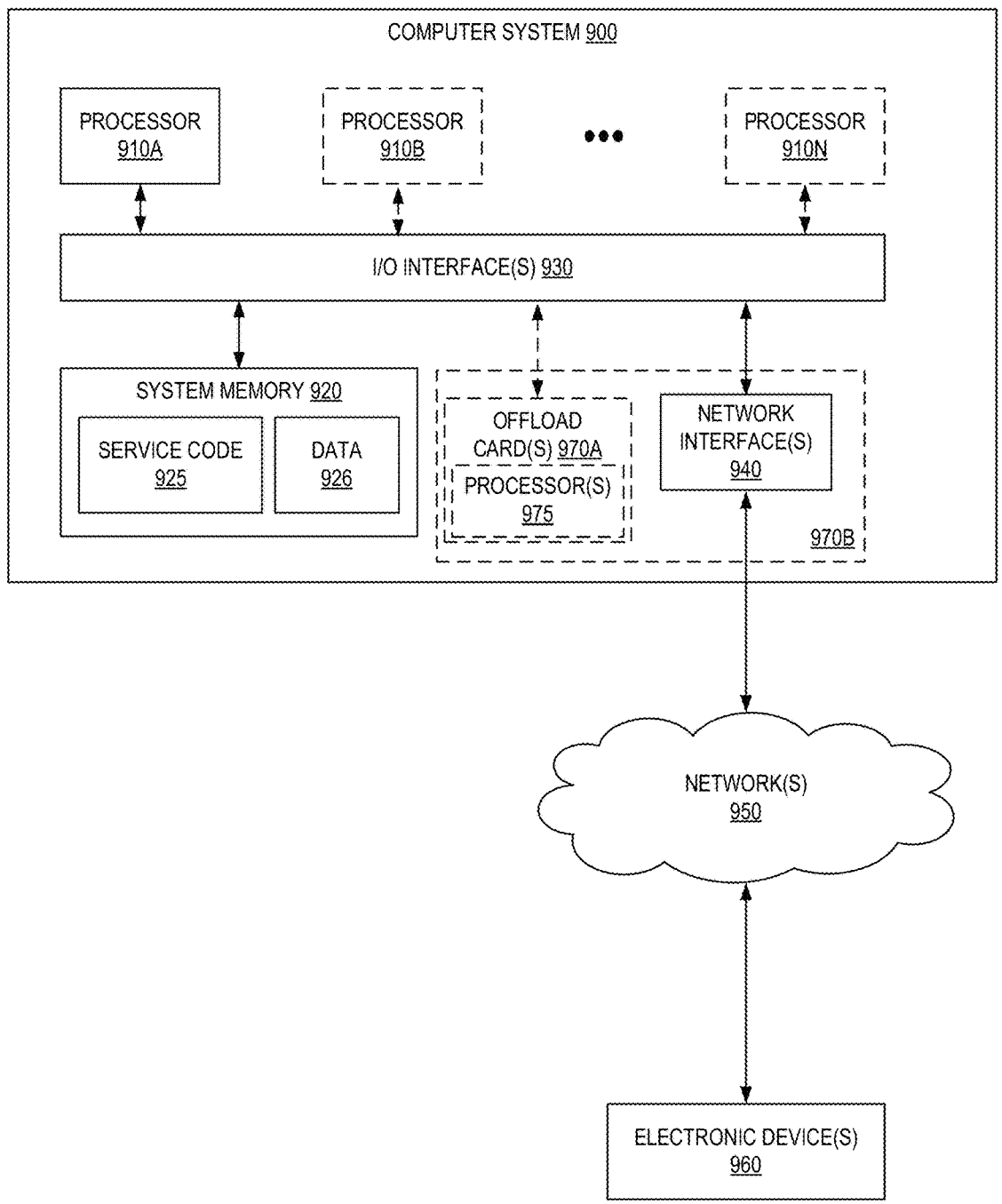
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as code 925 of computer vision service 118, stream processing service 112, or notification service 120 (e.g., executable to implement, in whole or in part, computer vision service 118, stream processing service 112, or notification service 120) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930 can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940 can support communication via any suitable wired or wireless general data networks, such as types of Ethernet network, for example. Additionally, the network interface 940 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments, the virtualization manager implemented by the offload card(s) 970A or 970B can accommodate requests from other entities (e.g., from compute instances themselves), but cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, or that blocks with solid borders are not optional in certain embodiments.

Unless the context clearly indicates otherwise, the term "or" is used in the foregoing specification and in the appended claims in its inclusive sense (and not in its exclusive sense) so that when used, for example, to connect a list of elements, the term "or" means one, some, or all the elements in the list.

Unless the context clearly indicates otherwise, the terms "comprising," "including," "having," "based on," "encompassing," and the like, are used in the foregoing specification and in the appended claims in an open-ended fashion, and do not exclude additional elements, features, acts, or operations.

Unless the context clearly indicates otherwise, conjunctive language such as the phrase "at least one of X, Y, and Z," is to be understood to convey that an item, term, etc. may be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

In the foregoing specification, the techniques have been described with reference to numerous specific details that may vary from implementation to implementation. The specification and drawings are, accordingly, to be regarded in an illustrative rather than a restrictive sense.

What is claimed is:

1. A computer-implemented method comprising:
    receiving, via an application program interface (API) endpoint of a computer vision service in a provider network, a request for label recognition across non-overlapping cameras, the request for label recognition across non-overlapping cameras comprising an identifier of a first video stream and comprising an identifier of a second video stream;
    receiving, via an application programming interface (API) endpoint of a stream processing service in a provider network, the first video stream from a first camera-equipped electronic device having a first field of view;
    receiving, via an application programming interface (API) endpoint of the stream processing service in the provider network, the second video stream from a second camera-equipped electronic device having a second field of view that does not overlap the first field of view;
    recognizing, by the computer vision service in the provider network, a label in a first video fragment of the first video stream based on applying a computer vision technique to the first video fragment;
    recognizing, by the computer vision service in the provider network, a label in a second video fragment of the second video stream based on applying a computer vision technique to the second video fragment;
    identifying, by the computer vision service in the provider network, that the label recognized in the first video fragment is the label recognized in the second video fragment; and
    sending, from a notification service in the provider network, a notification that the label was recognized in video captured by the first camera-equipped electronic device and in video captured by the second camera-equipped electronic device;
    wherein:
        the notification comprises a first reference to a first video frame of the first video fragment,
        the notification comprises a second reference to a second video frame of the second video fragment,
        the first video frame is annotated with a first bounding box encompassing the label recognized in the first video fragment,
        the second video frame is annotated with a first bounding box encompassing the label recognized in the second video fragment, and
        the first bounding box and the second bounding box are each associated with a same text label that indicates that the label recognized in the first video fragment is the label recognized in the second video fragment.

2. The computer-implemented method of claim 1, wherein:
    the request for label recognition across non-overlapping cameras comprises a target label;
    the label recognized in the first video fragment is an instance of the target label; and
    the label recognized in the second video fragment is an instance of the target label.

3. The computer-implemented method of claim 1, wherein:
    the request for label recognition across non-overlapping cameras comprises an ordering of the first video stream and the second video stream;
    the method further comprises determining, by the computer vision service in the provider network, an order in which the label recognized in the first video fragment first appears in the first video fragment and the label recognized in the second video fragment first appears in the second video fragment; and
    the method further comprises determining, by the computer vision service in the provider network, that the determined order satisfies the ordering of the request.

4. A computer-implemented method comprising:
receiving a request for label recognition across non-overlapping cameras;
receiving a first video stream from a first camera-equipped electronic device having a field of view;
receiving a second video stream from a second camera-equipped electronic device having a field of view that does not overlap the field of view of the first camera-equipped electronic device;
recognizing a label in a first video fragment of the first video stream based on applying a computer vision technique to the first video fragment;
recognizing a label in a second video fragment of the second video stream based on applying a computer vision technique to the second video fragment;
determining that the label recognized in the first video fragment is the label recognized in the second video fragment; and
sending a notification that the label was recognized across non-overlapping cameras;
wherein:
the notification comprises a first reference to a first video frame of the first video fragment,
the notification comprises a second reference to a second video frame of the second video fragment,
the first video frame is annotated with a first bounding box encompassing the label recognized in the first video fragment,
the second video frame is annotated with a first bounding box encompassing the label recognized in the second video fragment, and
the first bounding box and the second bounding box are each associated with a same text label that indicates that the label recognized in the first video fragment is the label recognized in the second video fragment.

5. The computer-implemented method of claim 4, wherein:
the request for label recognition across non-overlapping cameras comprises a target label;
the label recognized in the first video fragment is an instance of the target label; and
the label recognized in the second video fragment is an instance of the target label.

6. The computer-implemented method of claim 4, wherein:
the request for label recognition across non-overlapping cameras comprises an ordering of the first video stream and the second video stream;
the method further comprises determining an order in which the label recognized in the first video fragment first appears in the first video fragment and the label recognized in the second video fragment first appears in the second video fragment; and
the method further comprises determining that the determined order satisfies the ordering of the request.

7. The computer-implemented method of claim 4, wherein the computer vision technique applied to the first video fragment comprises a label tracking technique; and wherein the computer vision technique applied to the second video fragment comprises a label tracking technique.

8. The computer-implemented method of claim 4, wherein:
the notification comprises a reference to a video fragment annotated to track a recognized label across video frames of the video fragment, the video fragment comprising the first video fragment and the second video fragment.

9. The computer-implemented method of claim 4, wherein sending the notification that the label was recognized across non-overlapping cameras comprises publishing the notification to a message channel at a notification service; and wherein the request for label recognition across non-overlapping cameras identifies the message channel.

10. The computer-implemented method of claim 4, wherein sending the notification that the label was recognized across non-overlapping cameras comprises sending the notification to a subscriber to a message channel at a notification service; and wherein the request for label recognition across non-overlapping cameras identifies the message channel.

11. The computer-implemented method of claim 4, wherein:
the method further comprises causing a graphical user interface to be presented at a personal electronic device, the graphical user interface comprising a first image and a second image, the first image based on a video frame of the first video fragment, the second image based on a video frame of the second video fragment, the first image annotated with a bounding box encompassing the label recognized in the first video fragment, the second image annotated with a bounding box encompass the label recognized in the second video fragment, and the graphical user interface indicating that the label recognized in the first video fragment is the label recognized in the second video fragment.

12. The computer-implemented method of claim 4, wherein both the label recognized in the first video fragment and the label recognized in the second video fragment are a same object, concept, event, or activity.

13. The computer-implemented method of claim 4, wherein the request specifies a target label to be recognized; and wherein the target label is person, pet, or face.

14. A system comprising:
a first one or more electronic devices to implement a stream processing service in a provider network, the stream processing service including instructions that upon execution cause the stream processing service to receive a first video stream from a first camera-equipped electronic device having a first field of view and to receive a second video stream from a second camera-equipped electronic device having a second field of view that does not overlap the first field of view;
a second one or more electronic devices to implement a computer vision service in the provider network, the computer vision service including instructions that upon execution cause the computer vision service to receive a request for label recognition across non-overlapping cameras, to recognize a label in a first video fragment of the first video stream based on applying a computer vision technique to the first video fragment, to recognize a label in a second video fragment of the second video stream based on applying a computer vision technique to the second video fragment, and to determine that the label recognized in the first video fragment is the label recognized in the second video fragment; and
a third one or more electronic devices to implement a notification service in the provider network, the notification service including instructions that upon execution cause the notification service to send a notification that the label was recognized in video captured by the first camera-equipped electronic device and in video captured by the second camera-equipped electronic device;

wherein:
the notification service includes instructions that upon execution cause the notification service to send the notification comprising a first reference to a first video frame of the first video fragment;
the notification service includes instructions that upon execution cause the notification service to send the notification comprising a second reference to a second video frame of the second video fragment;
the computer vision service includes instructions that upon execution cause the computer vision service to annotate the first video frame with a first bounding box encompassing the label recognized in the first video fragment;
the computer vision service includes instructions that upon execution cause the computer vision service to annotate the second video frame with a first bounding box encompassing the label recognized in the second video fragment; and
the computer vision service includes instructions that upon execution cause the computer vision service to annotate the first bounding box and the second bounding box in the first video frame and the second video frame with a same text label that indicates that the label recognized in the first video fragment is the label recognized in the second video fragment.

15. The system of claim 14, wherein:
the request for label recognition across non-overlapping cameras comprises a target label;
the computer vision service includes instructions that upon execution cause the computer vision service to recognize an instance of the target label in the first video fragment; and
the computer vision service includes instructions that upon execution cause the computer vision service to recognize an instance of the target label in the second video fragment.

16. The system of claim 14, wherein:
the request for label recognition across non-overlapping cameras comprises an ordering of the first video stream and the second video stream;
the computer vision service includes instructions that upon execution cause the computer vision service to determine an order in which the label recognized in the first video fragment first appears in the first video fragment and the label recognized in the second video fragment first appears in the second video fragment; and
the computer vision service includes instructions that upon execution cause the computer vision service to determine that the determined order satisfies the ordering of the request.

17. The system of claim 14, wherein:
the computer vision service includes instructions that upon execution cause the computer vision service to apply a label tracking technique to the first video fragment; and
the computer vision service includes instructions that upon execution cause the computer vision service to apply the label tracking technique to the second video fragment.

18. The system of claim 14, wherein:
the computer vision service includes instructions that upon execution cause the computer vision service to annotate the first video fragment with a set of one or more bounding boxes that track the label recognized in the first video fragment across video frames of the first video fragment; and
the computer vision service includes instructions that upon execution cause the computer vision service to annotate the second video fragment with a set of one or more bounding boxes that track the label recognized in the second video fragment across video frames of the second video fragment.

* * * * *